US010766495B2

(12) United States Patent
Matsuda et al.

(10) Patent No.: US 10,766,495 B2
(45) Date of Patent: Sep. 8, 2020

(54) ONBOARD APPARATUS, INFORMATION PROCESSING APPARATUS, AND INFORMATION PROCESSING METHOD

(71) Applicant: TOYOTA JIDOSHA KABUSHIKI KAISHA, Toyota-shi, Aichi-ken (JP)

(72) Inventors: Masayuki Matsuda, Seto (JP); Kazuhiko Nakanishi, Kariya (JP); Yuko Mizuno, Nagoya (JP); Satoshi Shimada, Chiryu (JP); Takuya Maekawa, Nisshin (JP); Yorichika Ishiyama, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/460,602

(22) Filed: Jul. 2, 2019

(65) Prior Publication Data
US 2020/0010090 A1    Jan. 9, 2020

(30) Foreign Application Priority Data
Jul. 6, 2018   (JP) .................. 2018-129039

(51) Int. Cl.
*B60W 40/09*   (2012.01)
*B60W 40/06*   (2012.01)
*B60W 40/04*   (2006.01)

(52) U.S. Cl.
CPC ............ *B60W 40/09* (2013.01); *B60W 40/04* (2013.01); *B60W 40/06* (2013.01)

(58) Field of Classification Search
CPC ....... B60W 40/09; B60W 40/06; B60W 40/04
USPC ..... 340/539.1, 539.11, 901–905, 933, 425.5, 340/438
See application file for complete search history.

(56) References Cited

U.S. PATENT DOCUMENTS

| | | | |
|---|---|---|---|
| 2007/0244637 A1* | 10/2007 | Singh ................. | G01C 21/3641 701/425 |
| 2015/0241235 A1* | 8/2015 | Lobato Fregoso .... | G01C 21/36 701/423 |
| 2017/0059331 A1* | 3/2017 | Ni ........................ | G01C 21/20 |
| 2018/0004211 A1* | 1/2018 | Grimm ............... | G01C 21/3407 |
| 2018/0164108 A1* | 6/2018 | Rahal-Arabi ....... | G01C 21/3484 |
| 2019/0316922 A1* | 10/2019 | Petersen .............. | A61B 5/18 |

FOREIGN PATENT DOCUMENTS

JP   2010-079469 A   4/2010

* cited by examiner

*Primary Examiner* — Daryl C Pope
(74) *Attorney, Agent, or Firm* — Oliff PLC

(57) ABSTRACT

An onboard apparatus comprises a controller configured to execute acquisition of information regarding a driving environment on a route from a riding point of a passenger riding on a vehicle to an alighting point where the passenger alights; and calculation of points given to a driver who drives the vehicle along the route according to the information regarding the driving environment.

8 Claims, 21 Drawing Sheets

| RESERVATION ID | DRIVER ID | VEHICLE NUMBER | DESTINATION | FELLOW PASSENGER ID | PLANNED RIDING POINT | PLANNED RIDING DATE AND TIME | PLANNED ALIGHTING POINT | PLANNED ALIGHTING DATE AND TIME |
|---|---|---|---|---|---|---|---|---|
| ... | ... | ... | ... | ... | ... | ... | ... | ... |
| S002 | D002 | | e | P001 | f | 2018/07/06 09:10 | g | 2018/07/06 09:40 |
| | | | | P002 | h | 2018/07/06 09:20 | e | 2018/07/06 10:00 |
| ... | ... | ... | ... | ... | ... | ... | ... | ... |

FIG. 7

| RESERVATION ID | DRIVER ID | SECTION | POSITIONAL INFORMATION HISTORY | PERSONS ON BOARD | DRIVING ENVIRONMENT | | |
|---|---|---|---|---|---|---|---|
| | | | | | WIPER ACTION HISTORY | ACCELERATION INFORMATION HISTORY | HEART RATE INFORMATION HISTORY |
| S002 | D002 | d→f | X0001 | D002 | W0001 | G0001 | V0001 |
| | | f→h | X0002 | D002,P001 | W0002 | G0002 | V0002 |
| | | h→g | X0003 | D002,P001,P002 | W0003 | G0003 | V0003 |
| | | g→e | X0004 | D002,P002 | W0004 | G0004 | V0004 |

FIG. 8

| RESERVATION ID | RIDING SECTION | SECTION POINT | DRIVING ENVIRONMENT COEFFICIENT | | | | TOTAL |
|---|---|---|---|---|---|---|---|
| | | | TIME ZONE | ROAD WIDTH | ROAD SURFACE | WEATHER | STRESS | |
| S002 | f — g (P001) | AAAA | T1 or T2 | SG(1) | RSG(1) | WE1 or WEG(1) | GF1 or CF2 | AAAA: [{(T1orT2)+SG(1)+RSG(1) +(WE1orWEG(1))+(GF1orCF2)}] / (NUMBER OF ITEMS OF DRIVING ENVIRONMENT COEFFICIENTS) |
| | h — g (P002) | BBBB | T1 or T2 | SG(2) | RSG(2) | WE1 or WEG(2) | GF1 or CF2 | BBBB: [{(T1orT2)+SG(2)+RSG(2) +(WE1orWEG(2))+(GF1orCF2)}] / (NUMBER OF ITEMS OF DRIVING ENVIRONMENT COEFFICIENTS) |

FIG. 9

ONBOARD APPARATUS, INFORMATION PROCESSING APPARATUS, AND INFORMATION PROCESSING METHOD

CROSS REFERENCE TO THE RELATED APPLICATION

This application claims the benefit of Japanese Patent Application No. 2018-129039, filed on Jul. 6, 2018, which is hereby incorporated by reference herein in its entirety.

BACKGROUND

Technical Field

The present disclosure relates to an onboard apparatus, an information processing apparatus, an information processing method and a program for supporting ridesharing.

Description of the Related Art

Recently, a transportation mode called ridesharing in which a plurality of users share a ride on the same vehicle has been gaining popularity. Disclosed in Japanese Patent Laid-Open No. 2010-079469 is a technique to add value to such service according to the number of people in a group sharing a ride.

SUMMARY

With the background technique mentioned above, however, no mechanism is found for taking the contribution of drivers offering ridesharing into consideration.

It is therefore an object of the present disclosure to provide a technique capable of increasing willingness to participate in ridesharing by giving incentives according to situations to drivers driving vehicles in ridesharing.

An aspect of the present disclosure is exemplified as an onboard apparatus. The onboard apparatus comprises a controller configured to execute acquisition of information regarding a driving environment on a route from a riding point of a passenger riding on a vehicle to an alighting point where the passenger alights; and calculation of points given to a driver who drives the vehicle along the route according to the information regarding the driving environment.

Further, another aspect of the present disclosure is exemplified as an information processing apparatus. The information processing apparatus comprises a communication unit; and a controller configured to execute via the communication unit, acquisition of information regarding a driving environment on a route from a riding point of a passenger riding on a vehicle to an alighting point where the passenger alights; and calculation of points given to a driver who drives the vehicle along the route according to the information regarding the driving environment.

Furthermore, still another aspect of the present disclosure is exemplified as an information processing method executed by a computer that includes a communication unit. The method comprises the steps of acquiring, via the communication unit, information regarding a driving environment on a route from a riding point of a passenger riding on a vehicle to an alighting point where the passenger alights; and calculating points given to a driver who drives the vehicle along the route according to the information regarding the driving environment.

Moreover, yet another aspect of the present disclosure is exemplified as a non-transitory computer readable storing medium recording a computer program for causing a computer including a communication unit to perform a method. The method comprises the steps of acquiring, via the communication unit, information regarding a driving environment on a route from a riding point of a passenger riding on a vehicle to an alighting point where the passenger alights; and calculating points given to a driver who drives the vehicle along the route according to the information regarding the driving environment.

With the present disclosure, it is possible to increase willingness to participate in ridesharing by giving incentives according to situations to drivers driving vehicles in ridesharing.

BRIEF DESCRIPTION OF THE DRAWINGS

FIG. 7 is an example of reservation information stored in a reservation information DB;

FIG. 8 is an example of route traveling information stored in a ridesharing management DB;

FIG. 9 is an example of point management information stored in the ridesharing management DB;

DESCRIPTION OF THE EMBODIMENTS

Figure 1:
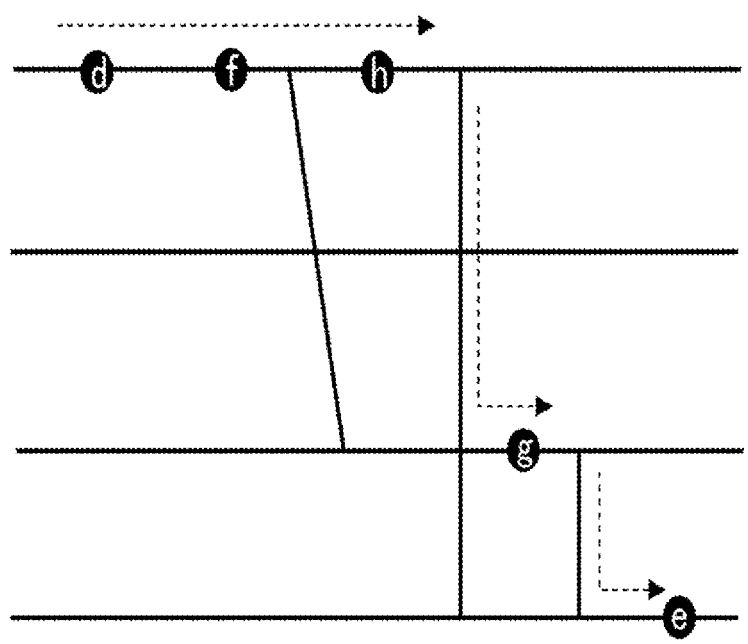
FIG. 1 is a diagram for describing a traveling mode by ridesharing.

A first mode of an embodiment is an onboard apparatus mounted on a vehicle used for ridesharing. The onboard apparatus according to the present embodiment has employed a configuration that acquirers a driving environment when running on a route from a traveling start point to a destination point in order to evaluate a contribution level of a driver driving the vehicle for ridesharing. Note here that the traveling start point is a riding point of a user (also referred to as a "fellow passenger") sharing a ride on the vehicle used for ridesharing, for example. Further, the destination point is an alighting point of the fellow passenger from the vehicle. The vehicle used for ridesharing travels a route at least from the start point to the destination point according to an operation of a user (also referred to as a "driver") driving the vehicle. The onboard apparatus according to the present embodiment records information regarding the acquired driving environment by associating the information with the route.

Note here that examples of the driving environment at the time of running on the route may be attributes of the route, such as a time zone and running distance on the route, a width and a paving state of the run road. When the time zone at the time of running on the route is nighttime, for example, visibility and a viewable range of the driver when the driver grasps a road condition is relatively lower compared with daytime, so that attention and concentration for driving the vehicle are needed. In a case of long running distance, attention and concentration for driving the vehicle are needed to be maintained compared with a case of short running distance. This is the same for the size of the width of the road and the extent of paving (for example, unpaved or paved) at the time of running. The difficulty of driving changes corresponding to the attributes of the route such as the time zone and running distance run on the route as well as the width and the extent of paving of the run road, so that burden of fatigue on the driver varies. However, at least a part of information regarding the driving environment can be acquired after traveling on the route. For example, the onboard apparatus may record the traveled route and, after traveling, may acquire the road condition and the like of the traveled route from a map information database or the like on the Internet.

Further, another example of the driving environment may be a weather condition at the time of running on the route. For example, when the weather at the time of running on the route is accompanied by fog, a rainfall, or a snowfall, the visibility when grasping the road condition becomes relatively lowered due to rain, snow, or the like attached on a windshield. Further, due to a wiper action for wiping away the rain, snow, or the like attached on the windshield, the viewable range when grasping the road condition becomes relatively narrow. Under such weather mentioned above, the driver needs more attention and concentration for driving the vehicle, and the difficulty of driving changes corresponding to the weather condition at the time of running on the route. The burden of fatigue on the driver is to vary corresponding to the weather condition at the time of running on the route. However, at least a part of the information regarding the driving environment can be acquired after traveling on the route. For example, after traveling, the onboard apparatus may acquire the weather condition and the like during a traveling period of the traveled route from a weather server and the like on the Internet.

Note that biological information of the driver at the time of running on the route may be acquired as the driving environment. It is because the burden of fatigue on the driver at the time of running on the route is reflected in the biological information as a stress state. Examples of such biological information may be a heart rate, blood pressure, blood flow, an electrocardiogram, and body temperature. In a case of explaining the heart rate as an example, for example, the heart rate under a stress state is relatively higher compared with the heart rate under a state without stress (normal state). Thus, it is possible to detect the stress state under the driving environment based on an increase change and a decrease change in the heart rate of the driver in accordance with time transition acquired at the time of traveling on the route. The onboard apparatus becomes capable of estimating the difficulty of driving that gives stress on the driver based on the time transition of the biological information at the time of running on the route.

The onboard apparatus according to the present embodiment calculates points to be given to the driver who drives the vehicle according to the driving environment at the time of running on the route. The onboard apparatus increases and decreases the points to be given in accordance with the attributes of the route such as the time zone and running distance run on the route as well as the width and extent of paving of the road, for example. Similarly, the onboard apparatus increases and decreases the points to be given in accordance with the weather condition at the time of running on the route. Further, the onboard apparatus increases and decreases the points to be given in accordance with an amount of changes in the biological information. As a result, the onboard apparatus according to the present embodiment becomes capable of giving the points in accordance with the difficulty of driving according to the driving environment, so that it is possible to perform appropriate evaluation of the contribution level of the driver at the time of running on the route under such driving environment.

The points calculated according to the driving environment can be reflected in a burden ratio of transportation cost (cost of fuel, passage fee, and the like) spent for traveling using ridesharing. For example, the burden ratio of the driver reflecting the points can be made relatively smaller than the burden ratio of a fellow passenger. Further, when a traveling service by using ridesharing is provided as a business, the points may be reflected in a relative evaluation of the driver and may provide a benefit to the driver according to the points. Examples of such benefit may be providing discount on the cost of fuel and passage fee, a wash service of the vehicle used in ridesharing, and a free maintenance service according to the points. With the present embodiment, it is possible to give an incentive to the driver of a vehicle 10 in accordance with the driving environment at the time of traveling on the route based on the calculated points.

Hereinafter, an embodiment will be described with reference to the accompanying drawings. A configuration of the embodiment below is an example, and aspects for embodying the present disclosure are not limited to the configuration of the embodiment.

First Embodiment

In the present embodiment, described is a case of performing ridesharing when a plurality of users intended to travel share a ride on the same vehicle. First, referring to FIG. 1, outline of ridesharing will be described.

(Outline of Ridesharing)

FIG. 1 is a diagram for describing a traveling mode by using ridesharing. In FIG. 1, it is assumed that a plurality of users (A, B, and C) share a ride on the same vehicle. It is also assumed that the user A travels from a departure point d to a destination point e, the user B travels from a departure point f to a destination point g, and the user C travels from a departure point h to the destination point e.

Note here that three vehicles are needed if each of the users A to C is to travel separately to respective destinations. In the meantime, it is possible for the users A to C to travel to the respective destinations by a single vehicle by sharing a ride. In an example for explanation illustrated in FIG. 1, for example, the user A is the driver of the vehicle and drives the vehicle from the point d to the point e. In this case, the user A picks up the user B at the point f in the vehicle the user A is driving and picks up the user C at the point h in the vehicle the user A is driving. Then, the user A travels via the point g to allow the user B to alight on the way of driving the vehicle to the point e that is the destination of the user A and the user C for enabling the user B to travel from the departure point f to the destination point g. Thereafter, the user A can also achieve traveling of the user A along with traveling of the user C from the departure point h to the destination point e by driving the vehicle to the point e.

With such ridesharing, the number of vehicles running on the roads is relatively suppressed, so that it is expected to ease the traffic jam and the like in a commuting time zone, for example. Further, for example, the transportation cost (cost of fuel, passage fee, and the like) spent for traveling using a vehicle can be shared by a plurality of users sharing a ride on the vehicle, so that it is possible to lighten the transportation cost borne per user compared with a case where each user separately travels by own vehicle. Note that the mode of ridesharing illustrated in FIG. 1 is simply an example.

(System Configuration)

Figure 2:
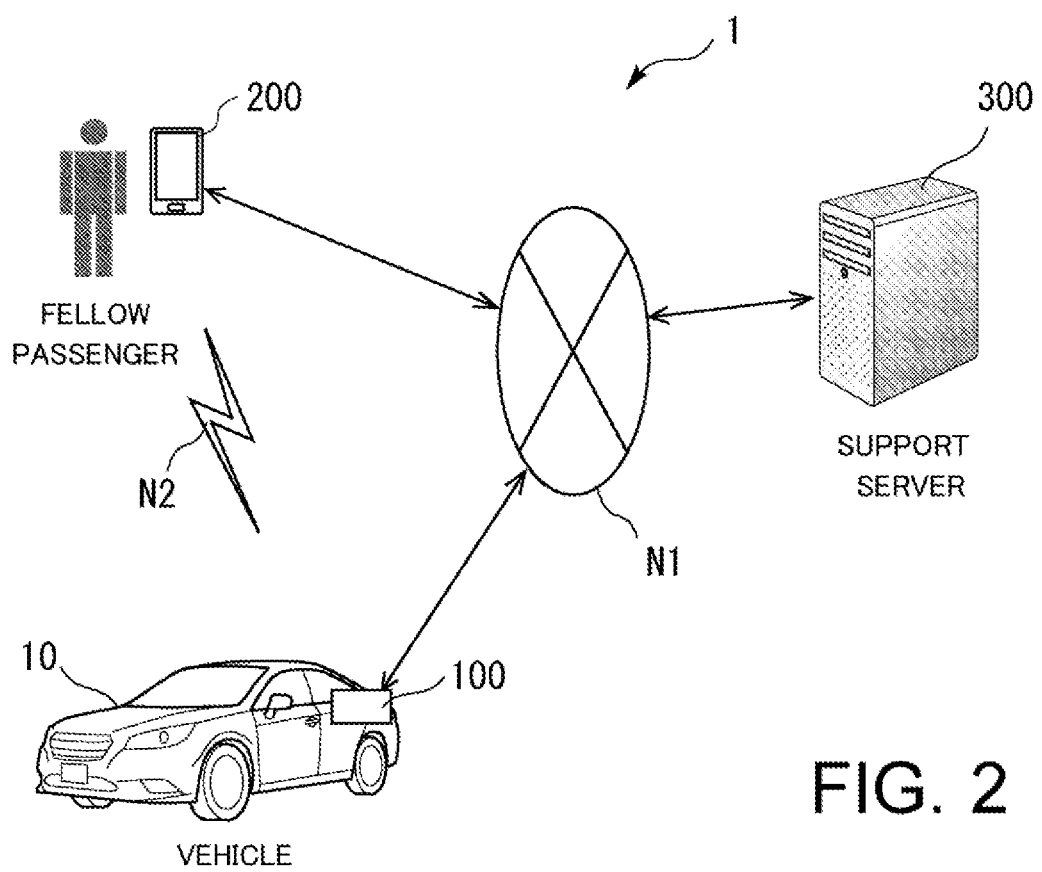
FIG. 2 is a diagram illustrating an example of a system configuration of a ridesharing support system according to a first embodiment.

FIG. 2 is a diagram illustrating an example of a system configuration of a ridesharing support system 1 according to the first embodiment. The ridesharing support system 1 is a system for supporting evaluation of the contribution level of the driver for ridesharing by recording the driving environment in traveling on the route at the time of traveling using ridesharing and calculating the points to be given to the driver according to the driving environment.

The ridesharing support system 1 illustrated in FIG. 2 includes: the vehicle 10 used for sharing a ride; an onboard apparatus 100 mounted on the vehicle 10; a user terminal 200 carried by the user (fellow passenger) sharing a ride on the vehicle 10; and a support server 300. The onboard apparatus 100, the user terminal 200, and the support server 300 are connected mutually via a network N1. Further, the onboard apparatus 100 and the user terminal 200 are connected via a network N2. The network N1 is a public network such as the Internet, for example. The network N1 may include a radio network of a mobile phone network, a dedicated network such as VPN (Virtual Private Network), LAN (Local Area Network), and the like. The network N2 may be a near field radio network including Bluetooth (R), NFC (Near Field Communication), BLE (Bluetooth Low Energy), and the like. The onboard apparatus 100 and the user terminal 20 are directly communicable via the network 2 inside the vehicle, for example.

In FIG. 2, illustrated as typical examples are the single vehicle 10 as the vehicle used for sharing a ride, the single user terminal 200, and the single support server 300. To the network N1 of FIG. 2, a plurality of support servers providing ridesharing support according to the present embodiment can be connected. Further, a plurality of onboard apparatuses each set on the vehicle to be a support target of each of the support servers providing the ridesharing support of the present embodiment can be connected to the network N1. Furthermore, a plurality of user terminals carried by fellow passengers sharing a ride on the vehicles provided with the ridesharing support and a plurality of user terminals of the drivers driving the vehicles provided with the ridesharing support can be connected to the network N1.

The onboard apparatus 100 acquires positional information of the own vehicle at the time of traveling on the route by ridesharing at a constant interval, and records the acquired positional information by associating it with information of time when the positional information is acquired. The positional information of the own vehicle at the time of traveling on the route is acquired regularly such as every prescribed unit distance like 1 km or every unit time like 1 minute. Further, the onboard apparatus 100 acquires positional information of a riding point of the fellow passenger to the vehicle 10 as well as positional information of an alighting point of the fellow passenger from the vehicle 10, and records the acquired positional information by associating them with information of time when the positional information is acquired. The onboard apparatus 100 notifies the support server 300 of the positional information recorded at the time of traveling on the route by ridesharing and at occurrence of an event.

Further, the onboard apparatus 100 acquires information regarding the driving environment at the time of traveling on the route by ridesharing, and records the acquired information by associating it with information of time when the information is acquired. The information regarding the driving environment includes attribute information of the route such as the width of the road and the extent of paving, for example. Note that the time zone at the time of running on the route can be identified from the time information associated with the driving environment. Further, as the information regarding the driving environment, it is also possible to include weather information that gives an influence upon the visibility and a viewable range for grasping the road condition and the like. Furthermore, as the information regarding the driving environment, biological information for grasping the stress state of the driver may be included. The information regarding the driving environment is acquired regularly by a prescribed distance unit or time unit. The onboard apparatus 100 notifies the support server 300 of the information regarding the driving environment recorded at the time of traveling on the route by ridesharing. Note that details of the onboard apparatus 100 will be described later. The onboard apparatus 100 or the support server 300 according to the present embodiment, however, may acquire the attribute information and the like of the traveled route from a map information database and the like on the Internet after traveling on the route. Moreover, the onboard apparatus 100 or the support server 300 according to the present embodiment may acquire the weather condition and the like of a traveling period of the travelled route from a weather server and the like on the Internet after traveling on the route.

In the user terminal 200, an application program (also referred to as "app" hereinafter) for enjoying ridesharing is installed, for example. The user wishing to travel by sharing a ride can register information regarding conditions and the like for sharing a ride (referred to as "request information" hereinafter) to the support server 300 by executing the app on the own user terminal 200. For example, the information regarding a riding section, riding date/time and the like when the user wishes to travel by sharing a ride can be registered with the support server 300 as the request information. Further, the driver of the vehicle 10 can register the information regarding a planned running section, a planned running date/time and the like of the own vehicle 10 with the support server 300 as the request information by executing the app on the own user terminal 200.

The support server 300 accepts the request information from the driver of the vehicle 10 and the request information from the user wishing to travel by sharing a ride. Then, the support server 300 performs matching for pairing the driver and the user sharing a ride on the vehicle based on the request information from the driver of the vehicle 10 and the request information from the user wishing to travel by sharing a ride. Note here that matching means linking the driver allowing a ride on the vehicle with the user wishing to travel by sharing a ride such that mutual conditions are satisfied. The support server 300 can perform matching of the driver of the vehicle 10 and the user wishing to travel by sharing a ride by using a known technique. For example, the support server 300 may select a vehicle the user can share a ride from vehicles that include at least the riding point or the alighting point of the user wishing to travel by sharing a ride in the running section and include the riding period wished by the user in the planned running period of the running section.

When processing of matching is completed, the support server 300 notifies, to the user terminal 200 of the user wishing to travel by sharing a ride, vehicle information of the vehicle 10 allowing a ride, driver information of the vehicle 10, travel information and the like of the vehicle 10. The vehicle information includes a model, a color type, a vehicle number, and the like of the vehicle, for example. The driver information includes sex, age, and the like, for example. The travel information includes a planned riding place to the vehicle 10, a planned alighting place, planned riding time, planned alighting time, existence of other fellow passengers, and the like, for example. Further, the support server 300 notifies, to the user terminal 200 of the driver of the vehicle 10, the information regarding sex and age of the fellow passenger, a riding place wished by the fellow passenger, planned riding time, destination, and the like. Then, when the driver and the user wishing to travel by sharing a ride approve matching based on the notified information, the user (fellow passenger) sharing a ride on the vehicle 10 is settled.

In addition to the functions described above, the support server 300 according to the present embodiment acquires positional information of the vehicle 10 at the time of traveling on the route and the information regarding the driving environment notified from the onboard apparatus 100. Then, the support server 300 calculates the point to be given to the driver for each route of the fellow passengers using ridesharing based on the acquired positional information and information regarding the driving environment. The support server 300 calculates the points by using the attribute information such as the time zone and running distance at the time of running on the route as well as width and the extent of paving of the run road as evaluation conditions, for example. Further, the support server 300 calculates the points by taking the weather at the time of running on the route as an evaluation condition, for example. Furthermore, the support server 300 calculates the points by taking the stress state of the driver acquired at the time of running on the route as an evaluation condition. The support server 300 according to the present embodiment is allowed to perform evaluation of relative difficulty for driving the riding section and level evaluation of the contribution level of the driver, for the fellow passenger who has used ridesharing, based on the calculated points. Note that details of the support server 300 will be described below.

(Hardware Configuration)

Figure 3:
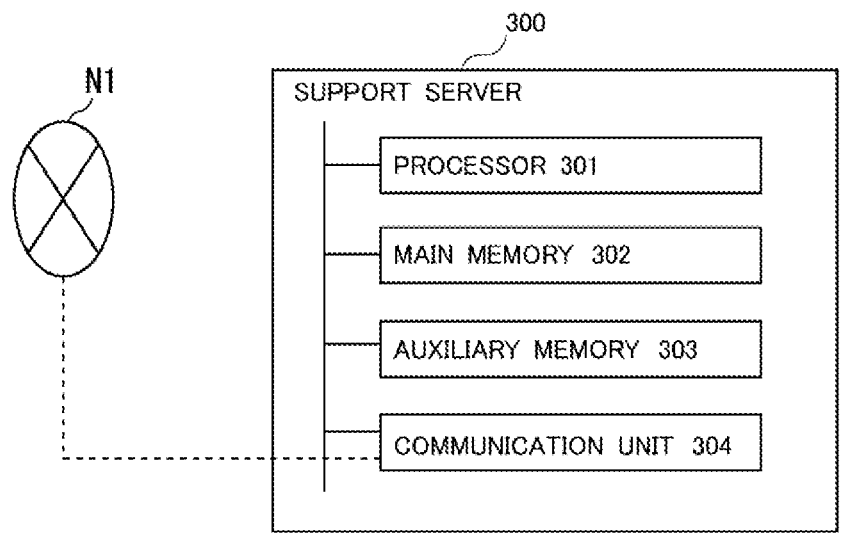
FIG. 3 is a diagram illustrating an example of hardware configuration of a support server.

FIG. 3 is a diagram illustrating an example of a hardware configuration of the support server 300. The support server 300 is a general-purpose or dedicated computer, for example. As components, the support server 300 includes a processor 301, a main memory 302, an auxiliary memory 303, and a communication unit 304 connected mutually via a bus. The main memory 302 and the auxiliary memory 303 are recording media that can be read by the support server 300. A plurality of each of the above components may be provided or some of the components may be omitted. The support server 300 is an example of an "information processing apparatus". The processor 301 is an example of a "controller".

The processor 301 is a CPU (Central Processing Unit), for example. The processor 301 executes a computer program loaded to be executable on a work area of the main memory 302, and performs control of the whole support server 300. The processor 301 provides the function matching a prescribed subject by controlling peripheral apparatuses through execution of the computer program. Note, however, that the processor 301 is not limited to be a single processor but may be a multiprocessor configuration. Also, the single CPU connected via a single socket may be a multicore configuration. Further, a part of processing functions provided by the support server 300 may be provided by a DSP (Digital Signal Processor), an ASIC (Application Specific Integrated Circuit), a GPU (Graphics Processing Unit), and the like. Furthermore, at least some of the processing functions may be an FPGA (Field-Programmable Gate Array), an exclusive LSI (Large Scale Integration) such as a numerical processor or an image processing processor, other digital circuit and analog circuit.

The main memory 302 stores therein a computer program executed by the processor 301 as well as data and the like processed by the processor 301. The main memory 302 is a flash memory, a RAM (Random Access Memory), a ROM (Read Only Memory) or the like, for example. The auxiliary memory 303 is a nonvolatile memory device for storing various kinds of programs and various kinds of data in a recording medium in a freely readable and writable manner. The auxiliary memory 303 is also called an external memory device. The auxiliary memory 303 is a flash memory, an HDD (Hard Disk Drive), an SSD (Solid State Drive), or the like, for example. An OS (Operating System), for example, is included in the various kinds of programs stored in the auxiliary memory 303. The OS includes a communication interface program for exchanging data with external devices and the like connected via the communication unit 304.

The communication unit 304 is an interface with the network N1. The communication unit 304 includes a LAN (Local Area Network) interface board and a radio communication circuit for radio communication. The support server 300 connects to the network N1 via the communication unit 304 and communicates with the onboard apparatus 100, the user terminal 200, and the like via the network N1.

Note that the hardware configuration of the support server 300 is not limited to the configuration illustrated in FIG. 3. For example, the support server 300 is capable of reading the program recorded in a removable recording medium, and loading the program on the main memory 302 to execute the program. Examples of the removable recording medium may be a disc recording media such as a USB (Universal Serial Bus) memory, a CD (Compact Disc), a DVD (Digital Versatile Disc), and a Blu-ray® disc.

Figure 4:
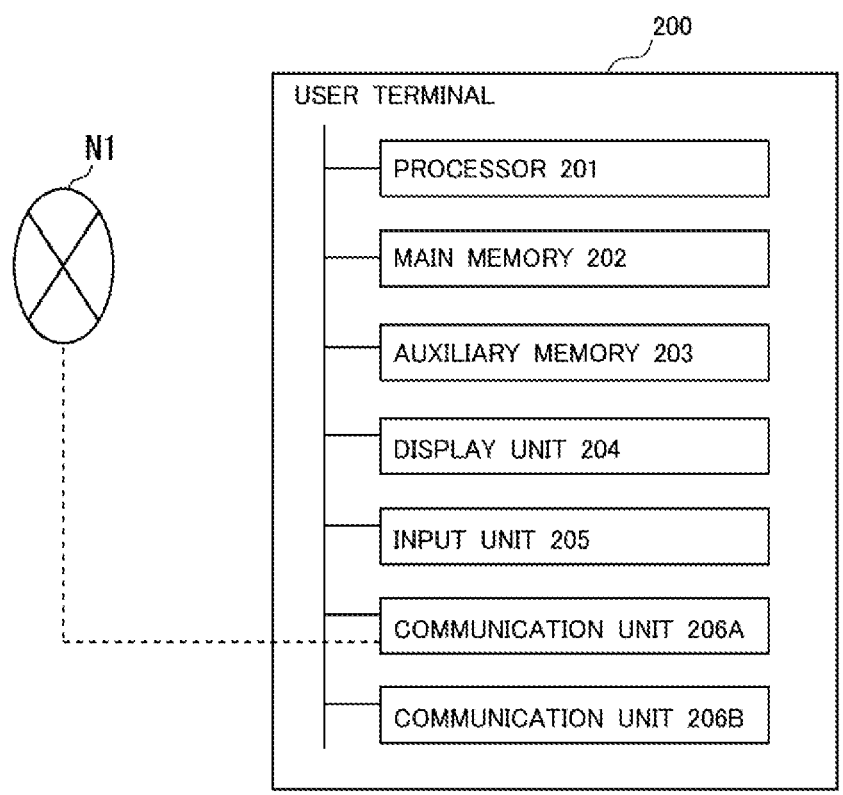
FIG. 4 is a diagram illustrating an example of a hardware configuration of a user terminal.

FIG. 4 is a diagram illustrating an example of the hardware configuration of the user terminal 200. The user terminal 200 is a small computer such as a smartphone, a mobile phone terminal, a tablet terminal, a personal information terminal, or a wearable computer (smartwatch or the like), for example. The user terminal 200 may be a PC (Personal Computer) that can be carried by the user.

The user terminal 200 includes a processor 201, a main memory 202, an auxiliary memory 203, a display unit 204, an input unit 205, a communication unit 206A, and a communication unit 206B. The processor 201, the main memory 202, and the auxiliary memory 203 are similar to the processor 301, the main memory 302, and the auxiliary memory 303 of the support server 300, so that explanations thereof are omitted. Note that the app for enjoying ridesharing is stored in the auxiliary memory 203 of the user terminal 200.

The display unit 204 is an LCD (Liquid Crystal Display), an EL (Electroluminescence) panel, or the like. The input unit 205 includes a touch panel or push buttons capable of inputting symbols such as characters, a microphone capable of inputting voice, a camera or the like capable of capturing motion videos and still pictures, for example.

The communication unit 206A is a communication circuit corresponding to a communication system employed for a mobile phone network such as radio communication like WiFi, LTE, LTE-Advanced, 3G, and the like. The user terminal 200 accesses the network N1 via the communication unit 206A to communicate with the support server 300 and the like.

The communication unit 206B is a communication circuit corresponding to a near field radio communication such as Bluetooth®, NFC (Near Field Communication), and BLE (Bluetooth Low Energy), for example. The user terminal 200 communicates with the onboard apparatus 100 mounted on the vehicle 10 via the communication unit 206B.

Figure 5:
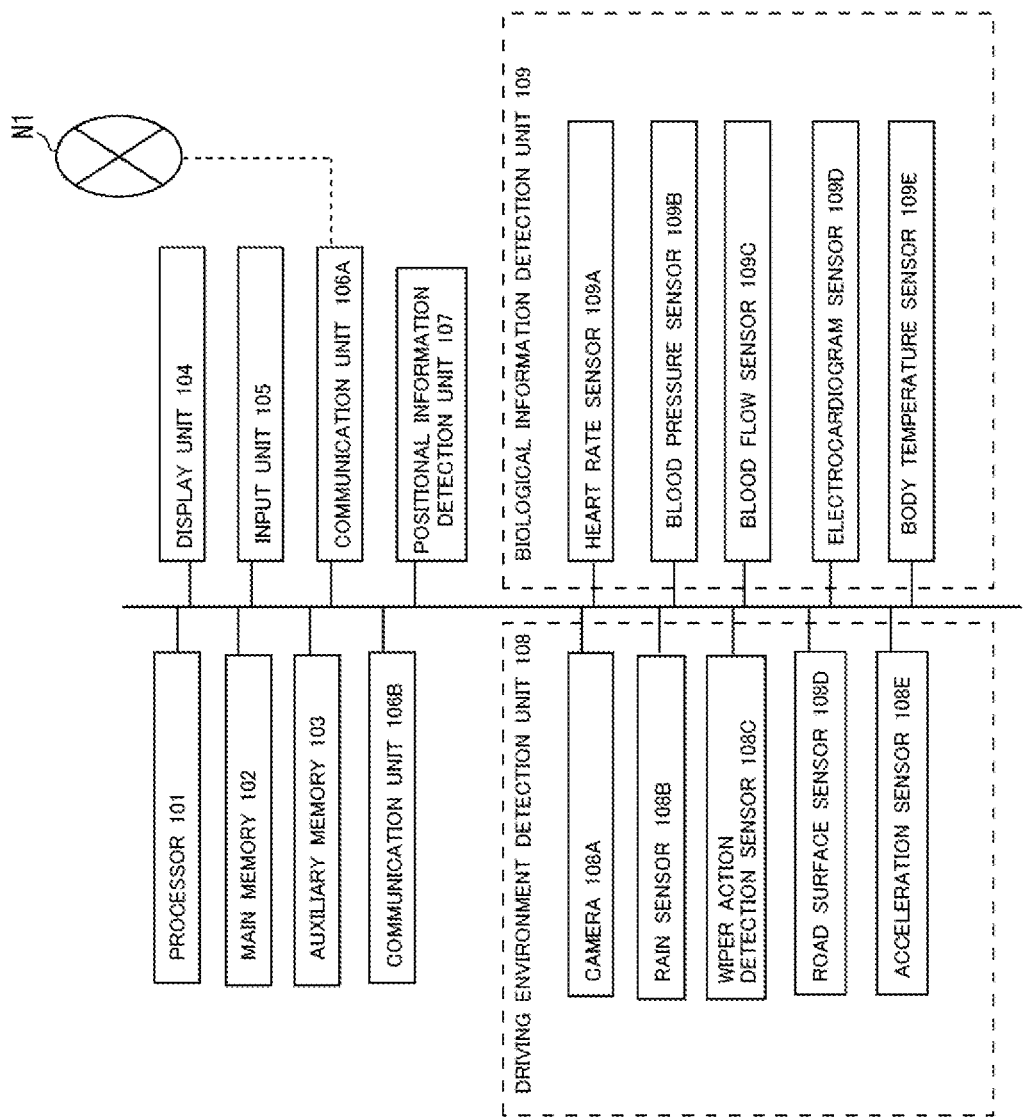
FIG. 5 is a block diagram illustrating an example of a hardware configuration of an onboard apparatus.

FIG. 5 is a diagram illustrating an example of the hardware configuration of the onboard apparatus 100. The onboard apparatus 100 is a computer capable of being mounted on the vehicle 10. The onboard apparatus 100 includes a processor 101, a main memory 102, an auxiliary memory 103, a display unit 104, an input unit 105, a communication unit 106A, a communication unit 106B, a positional information detection unit 107, a driving environment detection unit 108, and a biological information detection unit 109. The processor 101, the main memory 102, and the auxiliary memory 103 are similar to the processor 301, the main memory 302, and the auxiliary memory 303 of the support server 300, so that explanations thereof are omitted. Further, the display unit 104, the input unit 105, the communication unit 106A, and the communication unit 106B are similar to the display unit 204, the input unit 205, the communication unit 206A, and the communication unit 206B of the user terminal 200, so that explanations thereof are omitted. Note that a plurality of each of the above components may be provided or some of the components may be omitted. The onboard apparatus 100 is an example of the "onboard apparatus". The processor 101 is an example of the "controller".

The positional information detection unit 107 detects positional information (latitude, longitude) of the own vehicle based on GPS signals from a plurality of GPSs (Global Positioning Satellites) orbiting the earth. The positional information detection unit 107 acquires the detected positional information at a prescribed interval, and records the positional information by associating it with the acquired time information. Further, the positional information detection unit 107 acquires positional information in accordance with a riding event and an alighting event of the fellow passenger to/from the vehicle 10, and records the positional information by associating it with time information at the time of occurrence of such events. Further, the information recorded by the positional information detection unit 107 is transmitted to the support server 300 connected to the network N1 via the communication unit 106A regularly or in response to a request from the support server 300.

Note that the onboard apparatus 100 may cooperate with a navigation apparatus or the like mounted on the vehicle 10 to acquire the positional information detected via a GPS reception unit provided to the navigation apparatus or the like. For example, the onboard apparatus 100 connects to an in-vehicle network such as a CAN (Controller Area Network) provided inside the vehicle. Then, the positional information detection unit 107 may acquire the positional information detected by the navigation apparatus or the like via the connected in-vehicle network.

Furthermore, when the onboard apparatus 100 cooperates with the navigation apparatus or the like mounted on the vehicle 10, it is possible to share the display unit, the input unit, and the like of the navigation apparatus or the like, for example, and allot those units to components capable of being used. Further, the onboard apparatus 100 becomes capable of using various kinds of functions provided by the navigation apparatus or the like, such as functions of setting transit points (riding points, alighting points) for ridesharing, guiding the route to the destination points including the transit points, and providing map information corresponding to the vehicle position, for example.

The driving environment detection unit 108 detects the road attributes of the route traveled using ridesharing and the weather. As illustrated in FIG. 5, the driving environment detection unit 108 includes a camera 108A, a rain sensor 108B, a wiper action detection sensor 108C, a road surface sensor 108D, and an acceleration sensor 108E. The camera 108A captures the condition of the road run by the vehicle 10 at the time of traveling on the route. The rain sensor 108B and the wiper action detection sensor 108C detect the weather accompanied by a rainfall, a snowfall, fog, or the like at the time of traveling on the route. The road surface sensor 108D and the acceleration sensor 108E detect the road surface condition of the route. Note, however, that the sensors and apparatuses for detecting the driving environment are not limited to the components of FIG. 5. The driving environment detection unit 108 records the detected attribute of the route and weather by associating them with the time information. The information recorded by the driving environment detection unit 108 is transmitted to the support server 300 connected to the network N1 via the communication unit 106A regularly or in response to a request of the support server 300. As described above, however, the support server 300 may acquire the route run by the vehicle 10 from the onboard apparatus 100 and acquire the attribute of the route from the map information database on the Internet, for example. Further, the support server 300 may acquire the position on the route run by the vehicle 10 and the time passing that position from the onboard apparatus 100, and acquire the weather condition on the route when the vehicle 10 runs from a weather server on the Internet, for example.

The camera 108A is an image capturing device using an image sensor such as CCD (Charged-Coupled Devices), a CMOS (Complementary Metal-Oxide-Semiconductor), or the like. The camera 108A may be a single-lens camera or may be a stereo camera. The camera 108A is provided at a casing frame of an inner rear-view mirror (room mirror), and captures videos of the road in a vehicle traveling direction at a prescribed frame period (30 fps, for example).

The onboard apparatus 100 may also cooperate with a drive recorder or the like mounted on the vehicle 10 instead of the camera 108A, and acquire video information captured via an image capturing unit provided by the drive recorder or the like. The onboard apparatus 100 may acquire the video information captured by the drive recorder or the like via the in-vehicle network such as the CAN, for example.

The rain sensor 108B is a sensor provided on an inner side of front glass (windshield glass) of the vehicle 10, and detects water drops and the like attached to the surface of the front glass. The rain sensor 108B includes an LED as an infrared light emitting element, a photodiode as a light-receiving element, a lens forming an optical path of the infrared light, and a control circuit, and receives the infrared light emitted from the light-emitting element by the light-receiving element by having the infrared light reflected at the front glass. When water drops are attached to the surface of the front glass, a reflection amount from the front glass is decreased since a part of the infrared light transmits through the water drops and is irradiated to the outside. The rain sensor 108B detects existence of rainfalls by detecting the infrared light amount received by the light-receiving element. Note, however, that the rain sensor 108B is not limited to such sensor but may be a sensor that senses rainfalls from vibration when rain drops or snowflakes hit the front glass, for example.

The wiper action detection sensor 108C detects a working state of a wiper blade for wiping out the water drops or the like attached to the front glass. The wiper action detection sensor 108C is an ECU (Electronic Control Unit) mounted on the vehicle 10 for controlling the working state of the wiper blade, for example. The ECU controls an actuator and the like for driving the wiper blade according to a control position of a wiper switch operated by the driver, for example. In the present embodiment, the ECU controls the actuator and, at the same time, functions as the wiper action detection sensor 108C that detects on/off of the wiper actions selected by an operation of the driver and working modes selected when operating the wiper. Note here that the wiper modes for working the wiper include a low-speed working mode (selection of the so-called "Lo") for operating the wiper blade at a low speed, a high-speed working mode (selection of the so-called "High") for operating at a high speed, and an intermittent working mode (selection of the so-called "INT") for operating intermittently at a constant cycle. The wiper action detection sensor 108C detects on/off of the wiper actions selected by an operation of the driver and the working mode selected when operating the wiper, and transmits the detected information to the onboard apparatus 100 via the in-vehicle network such as the CAN.

When the wiper action detection sensor 108C is provided, provision of the rain sensor 108B to the onboard apparatus 100 may be omitted. It is because whether or not the weather condition at the time of running on the route is a condition accompanied by fog, a rainfall, or a snowfall can be estimated according to on/off of the wiper actions detected by the wiper action detection sensor 108C. Also, it is because the amount of precipitation due to fog, rainfalls, or snowfalls can be estimated according to the working mode selected when operating the wiper. For example, when the high-speed mode is selected when operating the wiper, it is estimated that a relatively larger amount of precipitation is generated compared with cases of the low-speed working mode and the intermittent working mode.

The road surface sensor 108D is an onboard sensor for detecting the road surface condition at the time of traveling on the route. The road surface sensor 108D includes an irradiation circuit that irradiates infrared light of a plurality of wavelengths to the road surface, and a measurement circuit that measures reflection of the infrared light of the plurality of wavelengths from the road surface. The road surface sensor 108D detects roughness of the road surface and the road surface state (existence of water, snow, ice, and the like on the road surface) from the measurement result of the plurality of wavelengths irradiated to the road surface. Note, however, that the road surface sensor 108D is not limited to such sensor. When the camera 108A is provided, it is also possible to detect the roughness of the road surface and the road surface state based on image analysis of frame images of videos captured by using the camera (images of a frame unit captured at a prescribed frame period). The road surface condition at the time of running on the route detected by the road surface sensor 108D is transmitted to the onboard apparatus 100 via the in-vehicle network such as the CAN.

The acceleration sensor 108E is a sensor that detects the acceleration in an up-and-down direction of the vehicle 10 at the time of traveling on the route. The acceleration sensor 108E forms a part of a sensor group provided to the vehicle for controlling the running state of the vehicle 10. It is possible to compare a relative extent of vibration changes in the up-and-down direction from the road surface at the time of running on the route based on the acceleration in the up-and-down direction detected by the acceleration sensor 108E. For example, when the vibration change in the up-and-down direction detected by the acceleration sensor 108E is relatively large, it is assumed that the road surface is unpaved or the extent of paving is rough. The acceleration in the up-and-down direction detected by the acceleration sensor 108E is transmitted to the onboard apparatus 100 via the in-vehicle network such as the CAN. Note that the acceleration sensor 108E is not limited to such sensor but may be a tire sensor provided inside a tire, for example. Also, either one of the road surface sensor 108D or the acceleration sensor 108E may be provided.

The biological information detection unit 109 detects the biological information for estimating the stress state of the driver at the time of traveling on the route in ridesharing. As illustrated in FIG. 5, the biological information detection unit 109 includes at least one out of a heart rate sensor 109A, a blood pressure sensor 109B, a blood flow sensor 109C, an electrocardiogram sensor 109D, and a body temperature sensor 109E. Note, however, that the configuration for detecting the biological information for estimating the stress state of the driver is not limited to the configuration illustrated in FIG. 5. Further, the sensor forming the biological information detection unit 109 may be attached to the body of the driver. The biological information detection unit 109 records the detected biological information by associating it with the time information. The information recorded by the biological information detection unit 109 is transmitted to the support server 300 connected to the network N1 via the communication unit 106A regularly or in response to a request from the support server 300.

The heart rate sensor 109A is also called a heart rate monitor or a pulse wave sensor, which irradiates LED (Light Emitting Diode) toward blood vessels of a human body and identifies the heart rate from the change in the blood flow according to the reflected light. The heart rate sensor 109A is attached to the body such as the wrist or the like of the user, for example. Note that the blood flow sensor 109C includes a light source (laser) and a light receiving unit (photodiode), and measures the blood flow amount based on the Doppler shift from scattered light from moving hemoglobin. Thus, the heart rate sensor 109A and the blood flow sensor 109C can share the detection unit.

The blood pressure sensor 109B includes a compression band (cuff) that is wound around an upper arm and then pumps air up for compression, a pump for sending the air to the cuff, and a pressure sensor that measures the pressure of the cuff. The blood pressure sensor 109B determines the blood pressure based on fluctuations in the pressure of the cuff conforming to the pulsation of the heart at a stage of reducing the pressure after compressing the cuff once (oscillometric method). Note, however, that the blood pressure sensor 109B may share the detection unit with the heart rate sensor 109A and the blood flow sensor 109C, and include a signal processing unit that converts the changes in the blood flow detected by the detection unit to the blood pressures.

The electrocardiogram sensor 109D includes an electrode and an amplifier, and acquires electric signals generated from the heart by being attached to the chest. The body temperature sensor 109E is the so-called electronic thermometer, and measures the body temperature while being in contact with the body surface of the user. Note, however, that the body temperature sensor 109E may be an infrared thermography. That is, it is also possible to employ a type that collects the infrared light emitted from the face or the like of the user and measures the temperature based on luminance of the infrared light irradiated from the surface of the face.

(Functional Configuration: Support Server)

Figure 6:
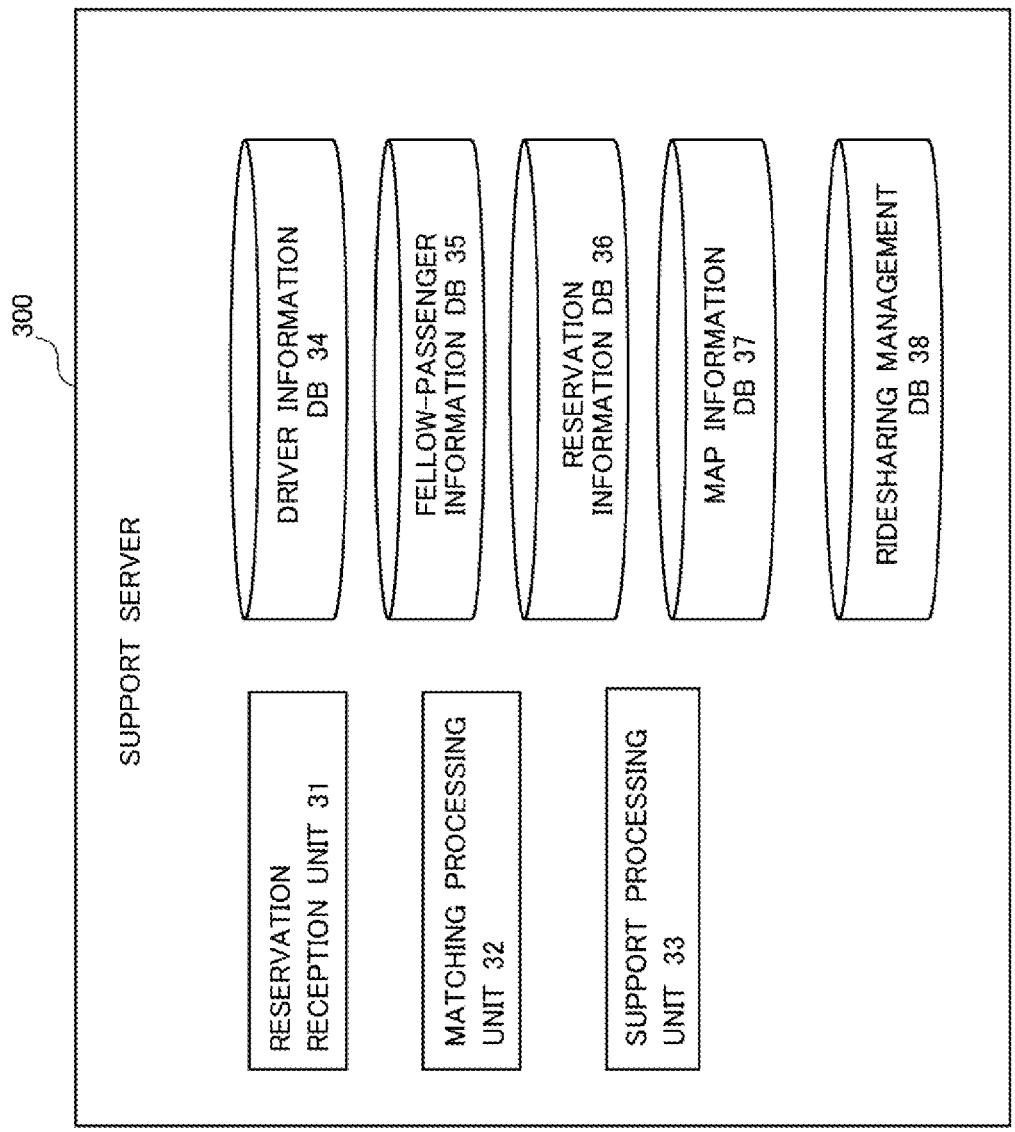
FIG. 6 is a diagram illustrating an example of a functional configuration of the support server.

FIG. 6 is a diagram illustrating an example of a functional configuration of the support server 300. As the functional components, the support server 300 includes a reservation reception unit 31, a matching processing unit 32, a support processing unit 33, a driver information database (DB) 34, a fellow-passenger information DB 35, a reservation information DB 36, a map information DB 37, and a ridesharing management DB 38. In the map information DB 37, stored is map information including map data having feature positions and POI (Point Of Interest) information such as characters and pictures indicating properties of each point on the map data. Note that the map information DB 37 may be provided from another system connected to the network N1, such as a GIS (Geographic Information System). Those functional components are the functional components provided when the processor 301 of the support server 300 executes various kinds of programs stored in the auxiliary memory 303. However, any one of the functional components or a part of the processing thereof may be executed by a hardware circuit. Further, any one of the functional components or a part of the processing thereof may be executed by another computer connected to the network N1.

The reservation reception unit 31 accepts the request information of the fellow passenger wishing to travel by sharing a ride, and stores the request information in the fellow-passenger information DB 35. The request information of the fellow passenger wishing to travel by sharing a ride is stored in the fellow-passenger information DB 35 by being associated with identification information (user ID) for identifying the fellow passenger. Note here that the user ID is member information that is given when downloading the app for enjoying ridesharing. Upon receiving a ridesharing request from the user terminal 200 operated by the fellow passenger via the communication unit 204, the reservation reception unit 31 acquires the user ID included in the ridesharing request. Then, the reservation reception unit 31 generates a record including the acquired user ID and the request information, and stores the record in the fellow-passenger information DB 35. After storing the request information and the like in the fellow-passenger information DB 35, the reservation reception unit 31 requests matching to the matching processing unit 32.

In the fellow-passenger information DB 35, stored is the request information including information indicating a place wished to ride (riding point), information indicating date and time wished to ride, information indicating a place wished to alight (alighting point), information indicating date and time wished to alight, sex, an age, and the like of the fellow passenger. Hereinafter, the user ID given to the fellow passenger is also referred to as a "fellow-passenger ID".

Further, the reservation reception unit 31 accepts the request information from the driver of the vehicle 10 allowing to share a ride, and stores the request information in the driver information DB 34. The request information from the driver of the vehicle 10 allowing to share a ride is stored in the driver information DB 34 by being associated with the identification information (user ID) identifying the driver (hereinafter, the user ID given to the driver is also referred to as a "driver ID"). Like the fellow-passenger ID, the driver ID is member information that is given when downloading the app for enjoying ridesharing. Upon receiving a running plan notification regarding the vehicle 10 from the user terminal 200 operated by the driver via the communication unit 304, the reservation reception unit 31 acquires the driver ID included in the running plan notification. Then, the reservation reception unit 31 generates a record including the acquired driver ID and the request information, and stores the record in the driver information DB 34.

In the driver information DB 34, stored is the request information including information indicating a departure point of the vehicle 10, information indicating planned date and time to be departed from the departure point, information indicating the destination the vehicle 10 is to arrive, information indicating planned date and time to be arrived at the destination, sex, an age, and the like of the driver. Further, in the driver information DB 34, stored is information identifying the vehicle 10 as well as identification information identifying the onboard apparatus 100. The information identifying the vehicle 10 may be a model, a color type, and a vehicle number of the vehicle 10, and the like.

The matching processing unit 32 performs matching for connecting the driver allowing a ride to share the vehicle and the fellow passenger wishing to travel by sharing a ride such that the mutual conditions are satisfied in response to the request from the reservation reception unit 31. As has been described, the matching processing can be done by using a known technique.

For example, a vehicle capable of sharing a ride is selected from the vehicles that include at least one of the riding point or the alighting point of the fellow passenger in the running section and include the planned period for running in the running section including the riding period the fellow passenger wishes to ride. Then, the matching processing unit 32 notifies the various kinds of information (driver information, traveling information, vehicle information, and the like) regarding the selected vehicle to the user terminal 200 of the fellow passenger. Further, the matching processing unit 32 notifies the various kinds of information (sex, age, desired riding point, desired riding time, desired alighting point, desired alighting time, and the like) of the fellow passenger to the user terminal 200 of the driver of the selected vehicle. When both approve the matching based on the information notified to each of the driver and the fellow passenger, ridesharing that is to travel by sharing the vehicle 10 is settled. After the ridesharing is settled, the matching processing unit 32 stores the information regarding the settled ridesharing in the reservation information DB 36. Note that the support server 300 notifies the reservation information regarding the onboard apparatus in response to a request from the onboard apparatus 100.

FIG. 7 is an example of the reservation information stored in the reservation information DB 36. As illustrated in FIG. 7, the reservation information regarding the settled ridesharing is managed as a reservation information table. Note that it is possible to add, change, and delete a field as appropriate for the information registered with the reservation information table.

The reservation information table illustrated in FIG. 7 includes each field of a reservation ID, a driver ID, a vehicle number, a destination, a fellow-passenger ID, a planned riding point, planned riding date and time, a planned alighting point, and planned alighting date and time. In the reservation ID field, stored is the reservation IDs for identifying each piece of reservation information. The reservation ID is given by the matching processing unit 32 to each piece of information regarding the settled ridesharing. In the driver ID field, stored is the ID for identifying the driver of the vehicle 10 allowing to share a ride. In the vehicle number field, stored is the ID (for example, vehicle registration number (number on a license plate) for identifying the vehicle 10. In the destination field, stored is the information indicating the destination of the vehicle 10 allowing to share a ride. Examples of the information indicating the destination may be the address of the destination, the latitude/longitude, the name of a landmark, and the like. In the fellow-passenger ID field, stored is the ID of the fellow passenger who is settled to share a ride on the vehicle 10.

In the planned riding point field, stored is the information of the planned riding point of the fellow passenger settled to share a ride. Examples of the information of the planned riding point may be the latitude/longitude of the planned riding place, the address, and the name of a landmark. In the planned riding date and time field, registered is the information indicating the planned date and time the fellow passenger settled to share a ride is to ride on the vehicle. In the planned alighting point field, stored is the information of the planned alighting point of the fellow passenger settled to share a ride. The information of the planned alighting point is similar to the information of the planned riding point. In the planned alighting date and time field, stored is the information indicating the planned date and time the fellow passenger settled to share a ride is to alight from the vehicle.

In "S002" of the reservation ID illustrated in FIG. 7, the destination of the vehicle driven by a driver D002 is "e". Further, it is illustrated that the driver D002 picks up a fellow passenger P001 at a point f at "2018/07/06 9:10" and drives the vehicle 10 toward a point g that is the planned alighting point. Further, it is illustrated that the driver D002 picks up a fellow passenger P002 at a point h at "2018/07/06 9:20", and drives the vehicle 10 toward the point e that is the planned alighting point. As described in FIG. 1, the planned alighting point g of the fellow passenger P001 is a via point of the route toward the destination the vehicle 10 arrives and the planned alighting point e of the fellow passenger P002.

Returning to FIG. 6, the support processing unit 33 performs support processing for evaluating the contribution level of the driver in accordance with the condition indicated in the information regarding the driving environment at the time of traveling on the route under ridesharing. Specifically, the support processing unit 33 acquires the information regarding the driving environment and the positional information at the time of traveling on the route notified regularly or in accordance with occurrence of an event from the vehicle 10 registered with the reservation information DB 36. The acquired positional information at the time of traveling on the route and the information regarding the driving environment is registered with the ridesharing management DB 38 as route traveling information by being associated with the reservation ID corresponding to the vehicle 10. Then, the support processing unit 33 calculates the points to be given to the driver based on the history of the information regarding the driving environment and the positional information as the route traveling information registered with the ridesharing management DB 38 in response to a request from the vehicle 10, for example. Note that the support processing unit 33 can acquire the running route of the vehicle 10 from the onboard apparatus 100 and acquire the attribute of the route from the map information database on the Internet, for example. Further, the support server 300 can acquire the position on the running route of the vehicle 10 and the time passing through the position from the onboard apparatus 100 and acquire the weather condition on the route when the vehicle 10 is running from a weather server on the Internet, for example.

The support processing unit 33 calculates the points by using the time zone as well as the running distance when running on the route and the attributes of the route such as the width as well as the extent of paving of the run road as the evaluation condition, for example. The support processing unit 33 identifies the time zone at the time of running on the route from the time information associated with the positional information, for example. Then, the support processing unit 33 can be set to give an extra point when the identified time zone is the time zone needing lighting up of a headlight, for example, and not to give the extra point in the other time zones. Further, the support processing unit 33 identifies the running distance on the route in the riding section of the fellow passenger by referring to the map information DB 37. Then, the support processing unit 33 can give the points that increment stepwise in accordance with the running distance and the distance segment such as a case of less than 10 km, a case of 10 km or more and less than 20 km, and a case of 20 km or more and less than 30 km, for example.

Further, the support processing unit 33 refers to the map information DB 37 to identify the attribute information such as the width of the road in the riding section of the fellow passenger and existence of paving. The support processing unit 33 identifies the width of the road with segments divided according to the number of lanes such as six lanes, four lanes, two lanes, and a single lane. Then, the support processing unit 33 can be set to give the point when the road in the riding section has a single lane, and not to give the point in the cases of the other number of lanes. Similarly, regarding the paving of the road, it is possible to set to give the point when the road in the riding section is unpaved and not to give the point when paved.

When the videos in the vehicle traveling direction captured by the camera 108A provided to the onboard apparatus 100 are acquired, the support processing unit 33 can also identify the attribute information such as the width and existence of paving of the road in the riding section based on the image processing performed on the videos. For example, vehicles, pedestrians, white lines, and the like may be recognized through pattern matching or the like performed on the frame images captured in a frame period to estimate the segment of the number of lanes. Further, it is also possible to estimate the distance to miscellaneous trees or the like on the shoulder of the road based on differences between the frame images captured in the frame period. Note that such processing may be performed by another information processing apparatus cooperating with the support server 300. The support processing unit 33 may notify the videos captured by the camera 108A to the cooperating information processing apparatus and acquire the result of processing.

Further, the support processing unit 33 can give the point in accordance with the road surface condition detected by the road surface sensor 108D. For example, it is possible to set to give the point if the detected roughness degree of the road surface exceeds a prescribed threshold value and not to give the point if not. Further, the support processing unit 33 may give the point in accordance with the segments of the detected road surface condition, such as a case of detecting a puddle on the road surface, a case of detecting snow, and a case of detecting ice.

Further, the support processing unit 33 can estimate whether the road is unpaved or the paving is in a rough state based on the range of vibration change in the up-and-down direction detected by the acceleration sensor 108E. For example, it is possible to give the point if the acceleration in the up-and-down direction detected by the acceleration sensor 108E exceeds a prescribed threshold value, and not give the point if not. Note that the point may be given assuming that the road is unpaved when the acceleration in the up-and-down direction exceeding the prescribed threshold value continues over a specific period (for example, unit time of 1 minute or the like).

Further, the support processing unit 33 calculates the points by using the weather state at the time of running on the route as the evaluation condition based on the detected value of the rain sensor 108B and the working state of the wiper blade detected by the wiper action detection sensor 108C. The support processing unit 33 can be set to give the point if rainfalls or the like are detected by the rain sensor 108B, for example, and not to give the point if not. Further, the support processing unit 33 can give the point in accordance with the segments of the working modes ("INT", "Lo", and "High") of the wiper in working detected by the wiper action detection sensor 108C. The support processing unit 33 can give the point in accordance with the amount of precipitation estimated from the working mode by using the working mode selected when the wiper works as the condition for evaluating the weather state at the time of running on the route.

Furthermore, when the biological information of the driver detected by the biological information detection unit 109 of the onboard apparatus 100 is acquired as the information regarding the driving environment, the support processing unit 33 can use the stress state of the driver estimated from the biological information as the evaluation condition. Referring to a case of the heart rate as an explanation example, the heart rate under a stress state is relatively higher than the heart rate under an unstressed state. Therefore, it is possible to set to give the point if the heart rate exceeds a prescribed threshold value and not to give the point if not. Further, it is also possible to set the threshold values for giving the points in a plurality of stages and give the points in accordance with the area segment where the detected heart rate belongs. This also applies for other biological information such as the blood pressure, blood flow, electrocardiogram, and body temperature.

The support processing unit 33 registers the points calculated according to the driving environment and the like at the time of traveling on the route with the ridesharing management DB 38. The support processing unit 33 notifies the calculated points to the onboard apparatus 100, for example.

FIG. 8 is an example of the route traveling information stored in the ridesharing management DB 38. The positional information and the information regarding the driving environment acquired from the vehicle 10 at the time of traveling on the route are managed as a route traveling information table as illustrated in FIG. 8. Note that it is possible to add, change, and delete a field as appropriate for the information registered with the route traveling information table.

The route traveling information table illustrated in FIG. 8 includes each field of the reservation ID, the driver ID, the section, the positional information history, the persons on board, and the driving environment. The reservation ID and the driver ID are the same as those in FIG. 7, so that explanations are omitted. In the section field, stored is the information indicating the section connecting between the points where riding and alighting of the persons on board (driver and fellow passenger) of the vehicle 10 take place. In the positional information history field, stored are the identification numbers for identifying the history data of the positional information of the vehicle 10 notified when traveling the section. In the persons on board field, stored is the information indicating the persons on board of the vehicle 10 when traveling the section. The driver of the vehicle 10 and the fellow passengers are included in the persons on board.

In the driving environment field, stored are the information indicating the attributes of the road, the information indicating the weather state, the information indicating the stress state of the driver detected by the onboard apparatus 100. The driving environment field of FIG. 8 is an example of a mode that employs wiper action information as the information indicating the weather state, acceleration information as the information indicating paving of the road surface, and heart rate information as the information indicating the stress state of the driver. Each piece of the information indicating the driving environment employed in the mode is stored in respective sub-fields of wiper action history, acceleration information history, and heart rate information history. In the mode, the information indicating other attributes of the road such as the width (number of lanes) of the road is identified by referring to the map information DB 37.

In the wiper action history sub-field, stored are the identification numbers for identifying the history data of wiper actions detected by the wiper action detection sensor 108C when traveling the section. In the acceleration information history sub-field, stored are the identification numbers for identifying the history data of acceleration information detected by the acceleration sensor 108E when traveling the section. In the heart rate information history sub-field, stored are the identification numbers for identifying the history data of heart rate information of the driver detected by the heart rate sensor 109A when traveling the section.

FIG. 9 is an example of point management information stored in the ridesharing management DB 38. The points calculated by the support processing unit 33 are managed as the point management information table as illustrated in FIG. 9. Note that FIG. 9 is a management example of a mode that gives a section point for the riding section of the fellow passenger identified by the fellow-passenger ID, and gives an extra to the section point according to the driving environment at the time of traveling on the route. Note that it is possible to add, change, and delete a field as appropriate for the information stored in the point management information table.

The point management information table illustrated in FIG. 9 includes each field of the reservation ID, the riding section, the section point, a driving environment coefficient, and total points. The reservation ID is the same as that in FIG. 7, so that explanations are omitted. In the riding section field, stored is the information indicating the section connecting between the points where riding and alighting for each fellow passenger of the vehicle 10 take place. In the section point field, stored are the section points calculated corresponding to the riding sections.

In the driving environment coefficient field, stored are evaluation coefficients calculated based on the information indicating the attributes of the road, the information indicating the weather state, the information indicating the stress state of the driver, and the like detected by the onboard apparatus 100. The driving environment coefficient field includes each sub-field of the time zone, the road width, the road surface, the weather, and the stress. In the time zone sub-field, stored are the evaluation coefficients corresponding to the time zones when traveling the riding sections. In the road width sub-field, stored are the evaluation coefficients corresponding to the width of the roads forming the riding sections. In a road surface sub-field, stored are the evaluation coefficients corresponding to the road surface state of the riding sections. In a weather sub-field, stored are the evaluation coefficients corresponding to the weather conditions when travelling the riding section. In the stress sub-field, stored are the evaluation coefficients corresponding to the stress state of the driver when traveling the riding sections. In the total point sub-field, stored are the points calculated by the support processing unit 33 to be given to the driver. In FIG. 9, an example of a processing expression for calculating the total points is illustrated. Note that details of the information including the processing expressions stored in the section point field, the driving environment field, and the total point field will be described later.

(Functional Configuration: Onboard Apparatus)

Figure 10:
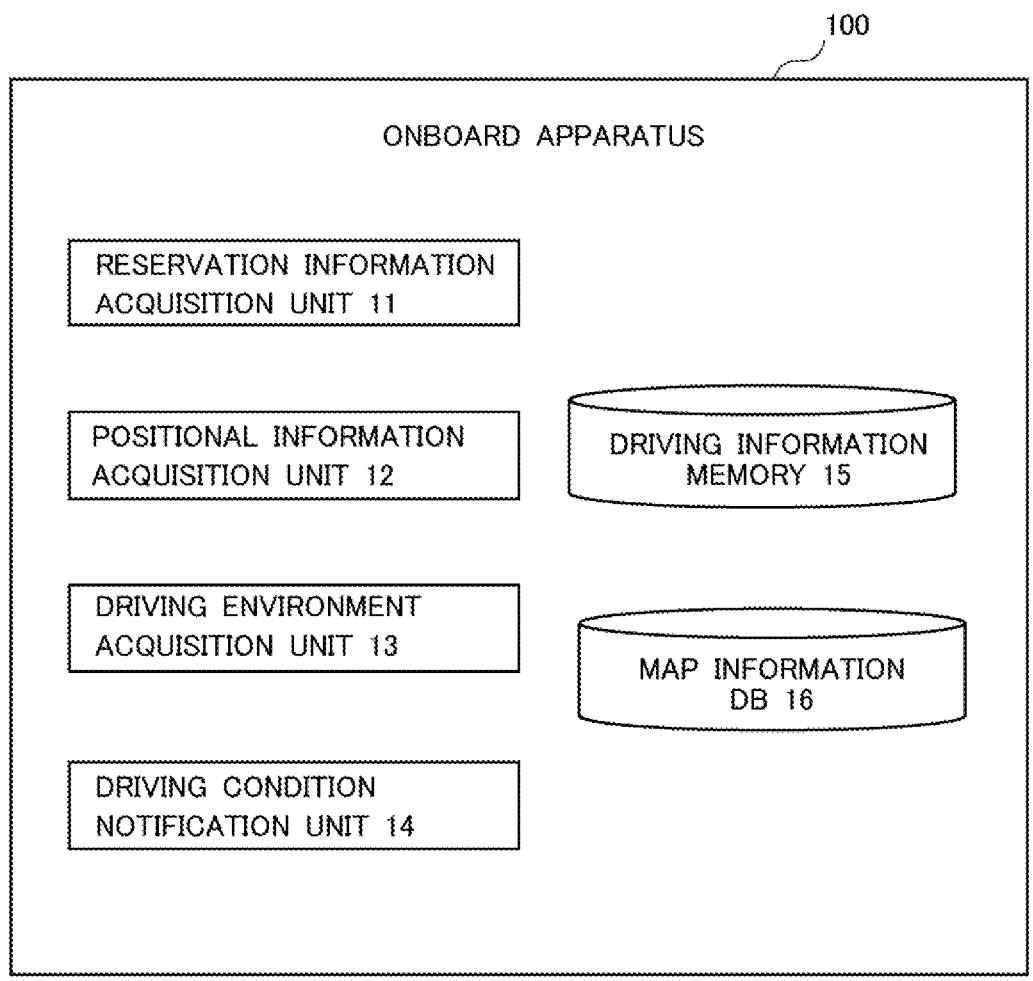
FIG. 10 is a diagram illustrating an example of a functional configuration of the onboard apparatus.

FIG. 10 is a diagram illustrating an example of the functional configuration of the onboard apparatus 100. As the functional components, the onboard apparatus 100 includes a reservation information acquisition unit 11, a positional information acquisition unit 12, a driving environment acquisition unit 13, a driving condition notification unit 14, a driving information memory 15, and a map information DB 16. In the map information DB 16, stored is the map information including map data having feature positions and POI information such as characters and pictures indicating properties of each point on the map data. The map information DB 16 may form a part of a vehicle navigation apparatus or the like mounted on the vehicle 10. Further, the map information may be provided from GIS connected to the network N1 or the support server 300. Those functional components are the functional components provided when the processor 101 of the onboard apparatus 100 executes various kinds of programs stored in the auxiliary memory 103. However, any one of the functional components or a part of the processing thereof may also be executed by a hardware circuit.

The reservation information acquisition unit 11 requests notification of ridesharing reservation information regarding the vehicle 10 to the support server 300 connected to the network N1 based on an operation input of the driver via the input unit 105. The reservation information acquisition unit 11 stores the acquired reservation information in the auxiliary memory 103. The reservation information stored in the auxiliary memory 103 is displayed on a display device of the display unit 104 in response to the operation input of the driver. The driver refers to the reservation information displayed on the display device, and identifies the traveling route to the destination related to ridesharing of the own vehicle. Identification of the traveling route to the destination is done by using the map information DB 16.

The positional information acquisition unit 12 periodically acquires the positional information (for example, latitude and longitude) of the own vehicle detected by the positional information detection unit 107 by associating it with the time information. The acquired positional information is recorded in the driving information memory 15. Further, the positional information acquisition unit 12 acquires the positional information of the own vehicle by taking, as a trigger, acquisition of the fellow-passenger ID at the time of riding or alighting from the user terminal 200 of the fellow passenger or an operation of the driver for inputting the fellow-passenger ID and riding/alighting. The fellow passenger starts the app, for example, and notifies the fellow-passenger ID and riding information or alighting information to the onboard apparatus 100 via the communication unit 206B of the user terminal 200. Then, the onboard apparatus 100 acquires, via the communication unit 106B, the fellow-passenger ID and the riding information or the alighting information notified from the user terminal 200. Alternatively, the driver may have the reservation information notified to the user terminal 200 of the fellow passenger presented, check consistency between the presented reservation information with the reservation information displayed on the display unit 104, and perform an operation for inputting the passenger ID and riding/alighting of the passenger. The acquired positional information is recorded in the driving information memory 15 by being associated with the time information, the fellow-passenger ID, the riding information or the alighting information.

The driver environment acquisition information 13 periodically acquires the information regarding the driving environment at the time of traveling on the route detected by the driving environment detection unit 108 by associating it with the identification number for identifying the component and the time information. For example, assumed is a case where the components forming the driving environment detection unit 108 are the wiper action detection sensor 108C and the acceleration sensor 108E. In such case, detection information detected by each component is acquired by being associated with the identification numbers such as "108C" and "108E". The acquired information regarding the driving environment is recorded in the driving information memory 15.

Further, the driving environment acquisition unit 13 periodically acquires the biological information of the driver at the time of traveling on the route detected by the biological information detection unit 109 by associating it with the identification number for identifying the component and the time information. The identification number for identifying the component in the biological information detection unit 109 is similar to the case of the driving environment detection unit 108. For example, "109A" is the identification number in a case of the heart rate sensor 109A. When there are a plurality of components, detection information detected for each component is acquired by being associated with the respective identification numbers. The acquired biological information is recorded in the driving information memory 15. Note that initial values of the biological information of the driver are acquired before starting travel of the vehicle 10 under ridesharing.

The driving condition notification unit 14 notifies the history of the positional information and the history of the information regarding the driving environment recorded in the driving information memory 15 to the support server 300 regularly or in accordance with the events such as riding or alighting of the fellow passenger. The driving condition notification unit 14 extracts the reservation ID from the reservation information acquired via the reservation information acquisition unit 11, and notifies the reservation ID to the support server 300 by associating with the history of the positional information and the history of the information regarding the driving environment recorded in the driving information memory 15.

(Flow of Processing: Onboard Apparatus)

Figure 11:
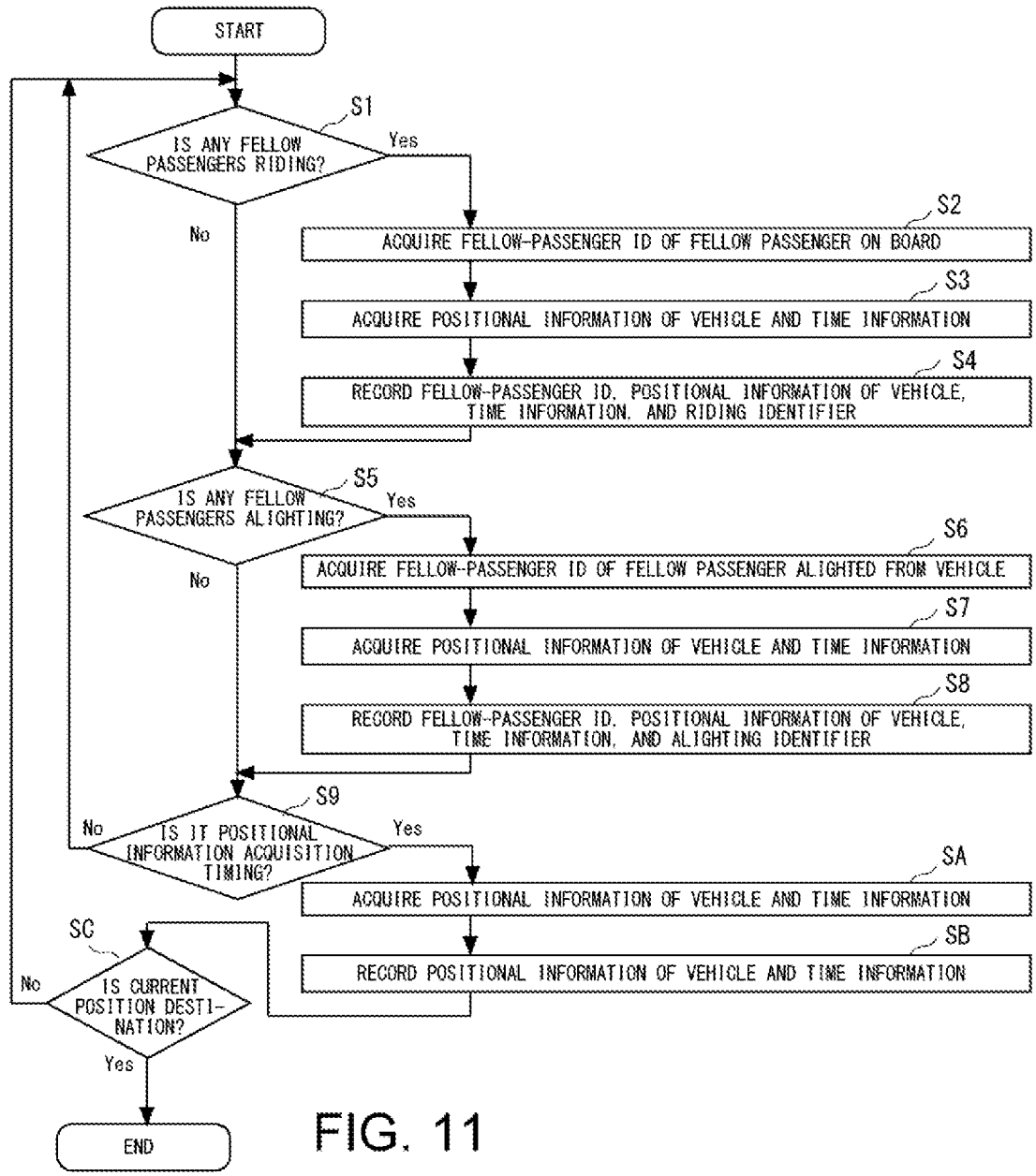
FIG. 11 is a flowchart illustrating an example of acquisition processing of positional information.
Figure 12:
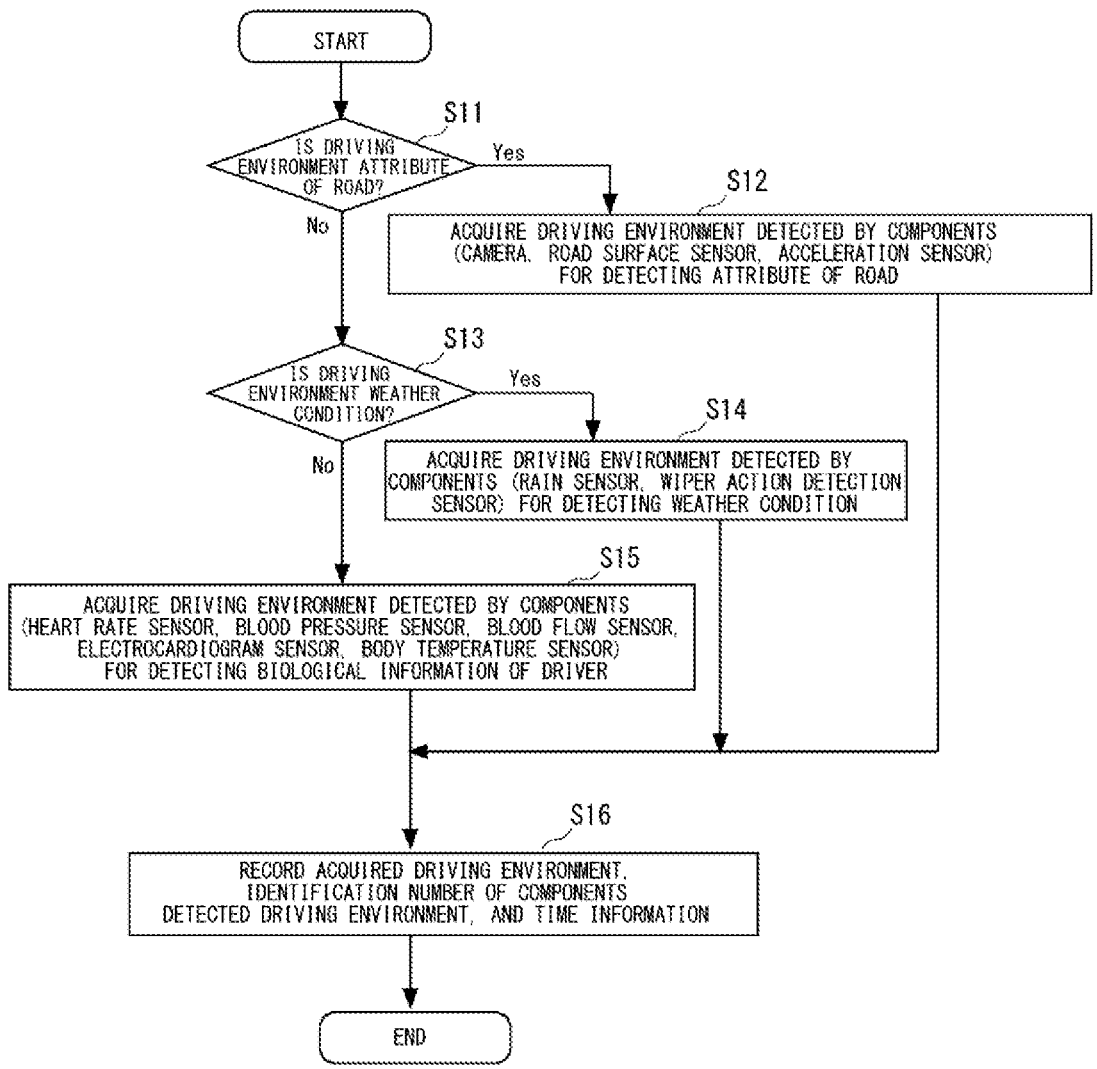
FIG. 12 is a flowchart illustrating an example of acquisition processing of information indicating a driving environment.

Next, processing of the onboard apparatus 100 according to the present embodiment will be described by referring to FIG. 11 and FIG. 12. FIG. 11 is a flowchart illustrating an example of acquisition processing of the positional information. FIG. 12 is a flowchart illustrating an example of acquisition processing of the information indicating the driving environment.

In the flowchart of FIG. 11, illustrated as the start of processing is when the vehicle 10 registered with the reservation information with the reservation ID starts traveling for ridesharing. The driver of the vehicle 10 performs an input operation via the input unit 105 of the onboard apparatus 100, for example, to acquire the reservation information regarding the reservation ID through the support server 300 connected to the network N1. The driver refers to the reservation information displayed on the display device of the display unit 104, and starts traveling on the route reaching the destination via the planned riding point and planned alighting point of each fellow passenger.

The onboard apparatus 100 determines whether or not there is a ride of a fellow passenger (S1). Whether or not there is a ride of a fellow passenger on the vehicle 10 is determined by the notification of the information regarding the ride from the user terminal 200 of the fellow passenger or the input operation of the information done by the driver regarding the ride of the fellow passenger. The fellow passenger planning to ride on the vehicle 10 communicates with the onboard apparatus 100 at the time of riding on the vehicle by operating the user terminal 200 where the app is started up, for example. The onboard apparatus 100 receives the fellow-passenger ID and a riding notification from the user terminal 200 via the communication unit 106B. When the received fellow-passenger ID matches the fellow-passenger ID registered with the reservation information, for example, the onboard apparatus 100 settles the received riding notification and determines that there is a ride on the vehicle 10. Further, when there is an input operation of the fellow-passenger ID and a ride on the vehicle via the input unit 105, the onboard apparatus 100 determines that there is a ride on the vehicle 10.

The onboard apparatus 100 shifts to processing of S2 when determining that there is a ride of the fellow passenger on the vehicle ("Yes" in S1). In the meantime, when determining that there is no ride of the fellow passenger in the vehicle ("No" in S1), the onboard apparatus shifts to processing of S5.

In the processing of S2, the onboard apparatus 100 acquires the fellow-passenger ID of the fellow passenger riding on the vehicle. The onboard apparatus 100 acquires the positional information of the own vehicle detected by the positional information detection unit 107 by associating it with the time information (S3). Then, the onboard apparatus 100 records the acquired fellow-passenger ID, positional information, and time information in the driving information memory 15 by associating them with an identifier indicating a ride on the vehicle (riding identifier) (S4), and shifts to the processing of S5. Note here that the identifier indicating a ride on the vehicle may be information expressed by binary statuses such as an inactive state and an active state. For example, when there is a ride on the vehicle, the onboard apparatus 100 sets the status of the identifier indicating a ride on the vehicle to an active state.

In the processing of S5, the onboard apparatus 100 determines whether or not there is alighting of the fellow passenger from the vehicle. The onboard apparatus 100 makes the determination by the notification of the information regarding alighting from the vehicle from the user terminal 200 of the fellow passenger in the vehicle or the input operation of the information done by the driver regarding the alighting of the fellow passenger from the vehicle. Determining whether or not there is alighting of the fellow passenger from the vehicle is done in a similar manner to the case of determining whether or not there is a ride on the vehicle, so that explanations are omitted.

When determined that there is alighting of the fellow passenger from the vehicle ("Yes" in S5), the onboard apparatus 100 shifts to processing of S6 and acquires the fellow-passenger ID of the fellow passenger alighted from the vehicle 10. Then, the onboard apparatus 100 acquires the positional information of the own vehicle by associating it with the time information (S7), and records the acquired fellow-passenger ID, positional information, and time information in the driving information memory 15 by associating them with an identifier indicating alighting of the vehicle (alighting identifier) (S8). The identifier indicating alighting of the vehicle is similar to the identifier indicating a ride. When there is alighting of the vehicle, for example, the onboard apparatus 100 sets the status of the identifier indicating alighting of the vehicle to an active state. The processing is shifted to processing of S9.

In the processing of S9, the onboard apparatus 100 determines whether or not it is a regular, periodic acquisition timing of the positional information. The determination is made based on whether or not a timing signal (trigger signal) for acquiring the positional information is in an active state, for example. When the timing signal is in an active state, the onboard apparatus 100 determines as being the regular acquisition timing of the positional information. When it is the regular, periodic acquisition timing of the positional information ("Yes" in S9), the onboard apparatus 100 shifts to processing of SA. In the meantime, when it is not the regular, periodic acquisition timing of the positional information ("No" in S9), the onboard apparatus 100 shifts to processing of S1.

In the processing of SA, the onboard apparatus 100 acquires the current positional information of the vehicle 10 detected by the positional information detection unit 107 by associating it with the time information. Then, the onboard apparatus 100 records the acquired positional information and the time information in the driving information memory 15 (SB), and shifts to the processing of SC.

In the processing of SC, the onboard apparatus 100 determines whether or not the current position of the vehicle 10 is the destination. When the positional information acquired in the processing of SB matches the destination registered with the reservation information, for example, the onboard apparatus 100 determines that the current position of the vehicle 10 is the destination. Note that matching of the destination registered in the reservation information and the positional information acquired in the processing of SB is done by referring to the map information DB 16. When the current position of the vehicle 10 is the destination ("Yes" in SC), the onboard apparatus 100 ends the processing of FIG. 11. In the meantime, when the current position of the vehicle 10 is not the destination ("No" in SC), the onboard apparatus 100 shifts to processing of S1.

Through the above processing, the onboard apparatus 100 can record, as the history, the positional information of the vehicle 10 acquired periodically at the time of traveling on the route until reaching the destination registered with the reservation information with the reservation ID. Further, when there is a ride of the fellow passenger on the vehicle 10, the fellow-passenger ID and the riding identifier are recorded along with the positional information of the riding point. Similarly, when there is alighting of the fellow passenger from the vehicle 10, the fellow-passenger ID and the alighting identifier are recorded along with the positional information of the alighting point. The onboard apparatus 100 can extract the history of the positional information recorded in the driving information memory 15 at an arbitrary timing as appropriate, and notify the extracted history of the positional information to the support server 300 connected to the network N1 via the communication unit 106A. Note that the extracted history of the positional information is transmitted to the support server 300 along with the reservation ID and the identification information of the onboard apparatus 100.

Next, acquisition processing of the information indicating the driving environment illustrated in FIG. 12 will be described. The processing of FIG. 12 is regularly executed until the vehicle 10 at the departure point reaches the destination registered with the reservation information with the reservation ID. Note that FIG. 12 is the flowchart illustrating an example of the processing for acquiring the attributes of the road as well as the weather condition detected via the driving environment detection unit 108 as the information indicating the driving environment and the biological information of the driver detected by the biological information detection unit 109.

In the flowchart of FIG. 12, illustrated as the start of processing is when receiving the driving environment detected via the driving environment detection unit 108 and the biological information detection unit 109. The onboard apparatus 100 determines whether or not the detected driving environment is the information regarding the attributes of the road (S11). When receiving the driving environment detected by the camera 108A, the road surface sensor 108D, and the acceleration sensor 108E, for example, the onboard apparatus 100 determines that the driving environment is the information regarding the attributes of the road.

When the received driving environment is the information regarding the attributes of the road ("Yes" in S11), the onboard apparatus 100 shifts to the processing of S12. In the meantime, when the received driving environment is not the information regarding the attributes of the road ("No" in S11), the onboard apparatus 100 shifts to the processing of S13. In the processing of S12, the onboard apparatus 100 acquires the driving environment regarding the attributes of the road detected by each of the components, and shifts to processing of S16.

In the processing of S13, the onboard apparatus 100 determines whether or not the detected driving environment is the information regarding the weather condition. When the driving environment detected by the rain sensor 108B and the wiper action detection sensor 108C is received, for example, the onboard apparatus 100 determines that the driving environment is the information regarding the weather condition.

When the received driving environment is the information regarding the weather condition ("Yes" in S13), the onboard apparatus 100 shifts to processing of S14. In the meantime, when the received driving environment is not the information regarding the weather condition ("No" in S13), the onboard apparatus 100 shifts to processing of S15. In the processing of S14, the onboard apparatus 100 acquires the driving environment regarding the weather condition detected by each of the components, and shifts to processing of S16.

In the processing of S15, the onboard apparatus 100 acquires the driving environment regarding the biological information of the driver detected by the components of the biological information detection unit 109 such as the heart rate sensor 109A, the blood pressure sensor 109B, the blood flow sensor 109C, the electrocardiogram sensor 109D, and the body temperature sensor 109E.

In the processing of S16, the onboard apparatus 100 associates and records the acquired driving environment, the identification numbers of the components detecting the driving environment, and the time information in the driving information memory 15. After the processing of S16, the processing illustrated in FIG. 12 is ended.

Through the above processing, the onboard apparatus 100 can record, as the history, the driving environment acquired regularly at the time of traveling on the route from the departure point of the vehicle 10 until reaching the destination registered in the reservation information with the reservation ID. The driving environment is recorded by being associated with the identification numbers of the components that detect the driving environment. The onboard apparatus 100 can extract the history of the driving environment recorded in the driving information memory 15 at an arbitrary timing as appropriate, and notify the extracted history of the driving environment to the support server 300 connected to the network N1 via the communication unit 106A. The history of the driving environment is transmitted to the support server 300 along with the reservation ID and the identification information of the onboard apparatus 100.

(Flow of Processing: Support Server)

Figure 13:
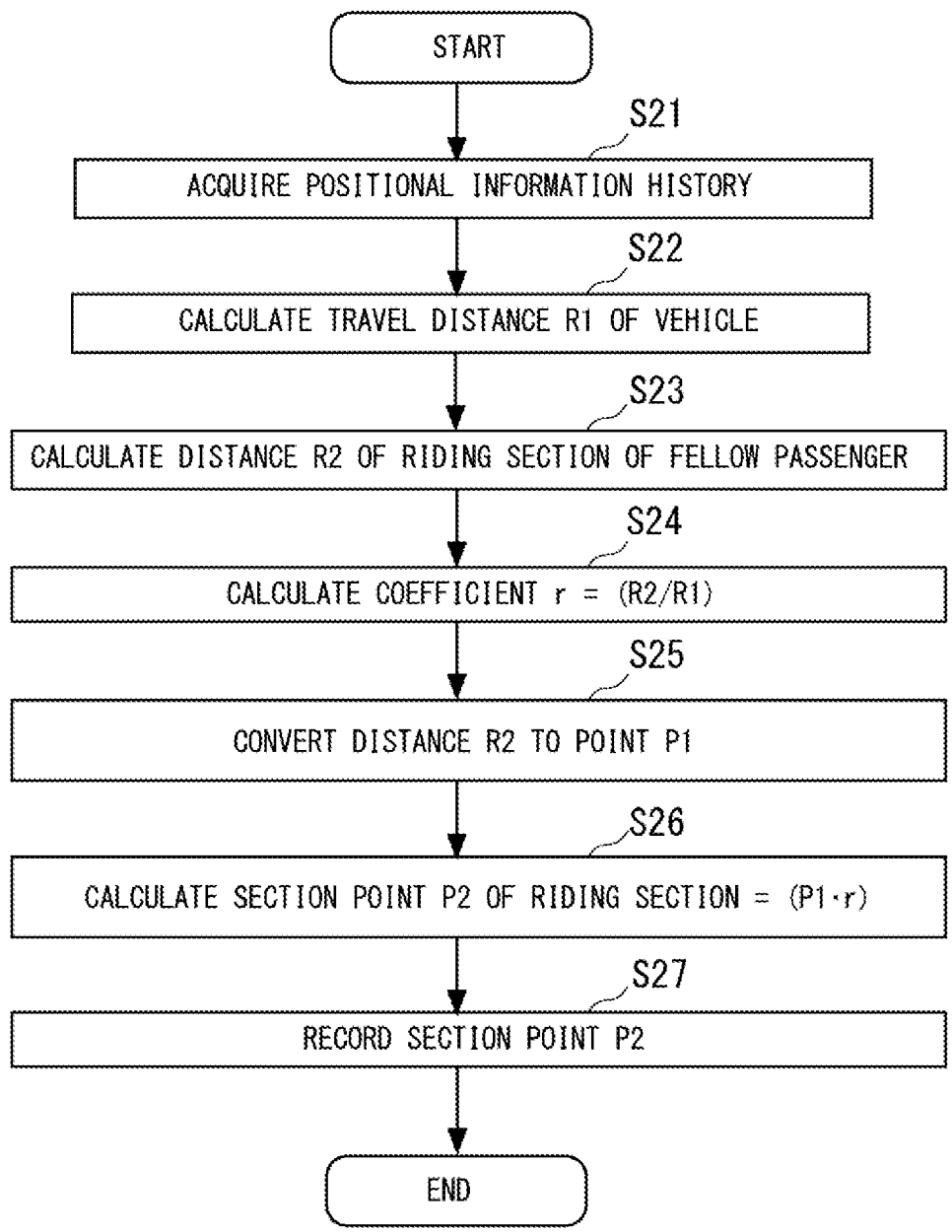
FIG. 13 is a flowchart illustrating an example of calculation processing of points according to distance of a riding section.

Next, by referring to FIG. 13 to FIG. 21, processing of the support server 300 according to the present embodiment will be described. FIG. 13 is a flowchart illustrating an example of calculation processing of the points according to the distance of the riding sections. With the processing of FIG. 13, the points according to the distance of the riding section where the fellow passenger rides on the vehicle 10 are calculated. The processing of FIG. 13 is executed for each of the fellow passengers sharing a ride on the vehicle 10.

In the flowchart of FIG. 13, illustrated as the start of processing is when receiving a point calculation request notified from the onboard apparatus 100. The onboard apparatus 100 notifies the point calculation request including the identification information of the apparatus itself and the reservation ID to the support server 300. The support server 300 searches the ridesharing management DB 38 using the received reservation ID as a search key to identify the route traveling information table corresponding to the reservation ID.

The support server 300 acquires the positional information history from the identified route traveling information table (S21). The support server 300 acquires the positional information history from the departure point of the vehicle 10 until reaching the destination. In the case of FIG. 8, acquired is the positional information history recorded from the point d until reaching the point e. The acquired positional information history is temporarily stored in a prescribed area of the main memory 302. In the explanations hereinafter, the explanatory diagram of FIG. 1 for describing ridesharing and the route traveling information table of FIG. 8 are used as an explanation example as appropriate.

In processing of S22, the support server 300 calculates travel distance R1 of the vehicle 10 based on the acquired positional information history. The support server 300 refers to the map information DB 37, for example, and identifies the traveling route from the departure point of the vehicle 10 until reaching the destination indicated in the positional information history. Referring to FIG. 1, for example, identified is the traveling route from the point d to the point e via the riding section of the user B (from the point f to the point g) and the riding section of the user C (from the point h to the point e). The support server 300 calculates the travel distance R1 from the identified traveling route and the map data of the map information DB 37. Through the processing of S22, the total travel distance (total driving distance of the driver) of the vehicle 10 used for ridesharing is identified. The calculated travel distance R1 is forwarded to processing of S24.

In processing of S23, the support server 300 calculates riding section distance R2 of the fellow passenger. The support server 300 refers to the map information DB 37 in a similar manner to the processing of S22 to identify the route of the riding section of the fellow passenger. Then, the support server 300 calculates the distance R2 from the identified route and the map data of the map information DB 37. Through the processing of S23, the travel distance (driving distance of the driver) of the vehicle 10 with the fellow passenger traveling by sharing a ride thereon is calculated. The calculated distance R2 is forwarded to the processing of S24.

In the processing of S24, the support server 300 calculates "coefficient r=(R2/R1)" based on the forwarded travel distance R1 and distance R2. Through the processing of S24, the coefficient r indicating a ratio of the driving distance driven with the fellow passenger sharing a ride on the vehicle with respect to the total driving distance of the driver is calculated. The calculated coefficient r is forwarded to processing of S26.

In processing of S25, the support server 300 converts the distance R2 to a point P1. The support server 300 converts the distance R2 to the point by using a point conversion coefficient per unit distance defined in advance, for example. For example, in a case where it is defined to give 1 point by taking 100 m as a unit distance, the distance R2 of 10 km is converted to 100 points. Through the processing of S25, the points according to the distance of the riding section of the fellow passenger are calculated. The calculated point P1 is forwarded to the processing of S26.

In the processing of S26, the support server 300 multiplies the forwarded point P1 and the coefficient r to calculate "section point P2 of riding section=(P1×r). Through the processing of S26, calculated are the section points distributed proportionally according to the ratio of the driving section driven by the vehicle 10 with the fellow passenger sharing a ride on the vehicle with respect to the total driving distance from the departure point to the destination. Then, the support server 300 records the calculated section point P2 in the ridesharing management DB 38 (S27). The section point P2 is stored in the section point field of the point management information table. After the processing of S27, the processing illustrated in FIG. 13 is ended.

Through the above processing, the support server 300 can identify the traveling route from the departure point of the vehicle 10 until reaching the destination via the riding point and alighting point of the fellow passenger based on the positional information notified from the onboard apparatus 100. The support server 300 can identify the riding section of the fellow passenger on the vehicle in a similar manner. The support server 300 can calculate the distance of the riding section and calculate the points corresponding to the distance. Then, the support server 300 can calculate the point of the section where the fellow passenger rode by reflecting the ratio occupying the riding section with respect to the total travel distance (total driving distance) from the departure point of the vehicle 10 until reaching the destination upon the point.

For example, in a case where the ratio occupying the riding section of the fellow passenger riding on the vehicle with respect to the total travel distance is high, the support server 300 can give a relatively high section point corresponding to the riding section. Further, in a case where the ratio occupying the riding section of the fellow passenger riding on the vehicle with respect to the total travel distance is low, the support server 300 can give a relatively low section point corresponding to the riding section. In the present embodiment, the section point is used as a basic point, and the driving environment is reflected in the section point as an extra coefficient. In the present embodiment, the total points with the extra coefficient calculated according to the driving environment reflected in the section point are calculated for each riding section where the fellow passenger rode on the vehicle, and the calculated points are given to the driver.

Figure 14:
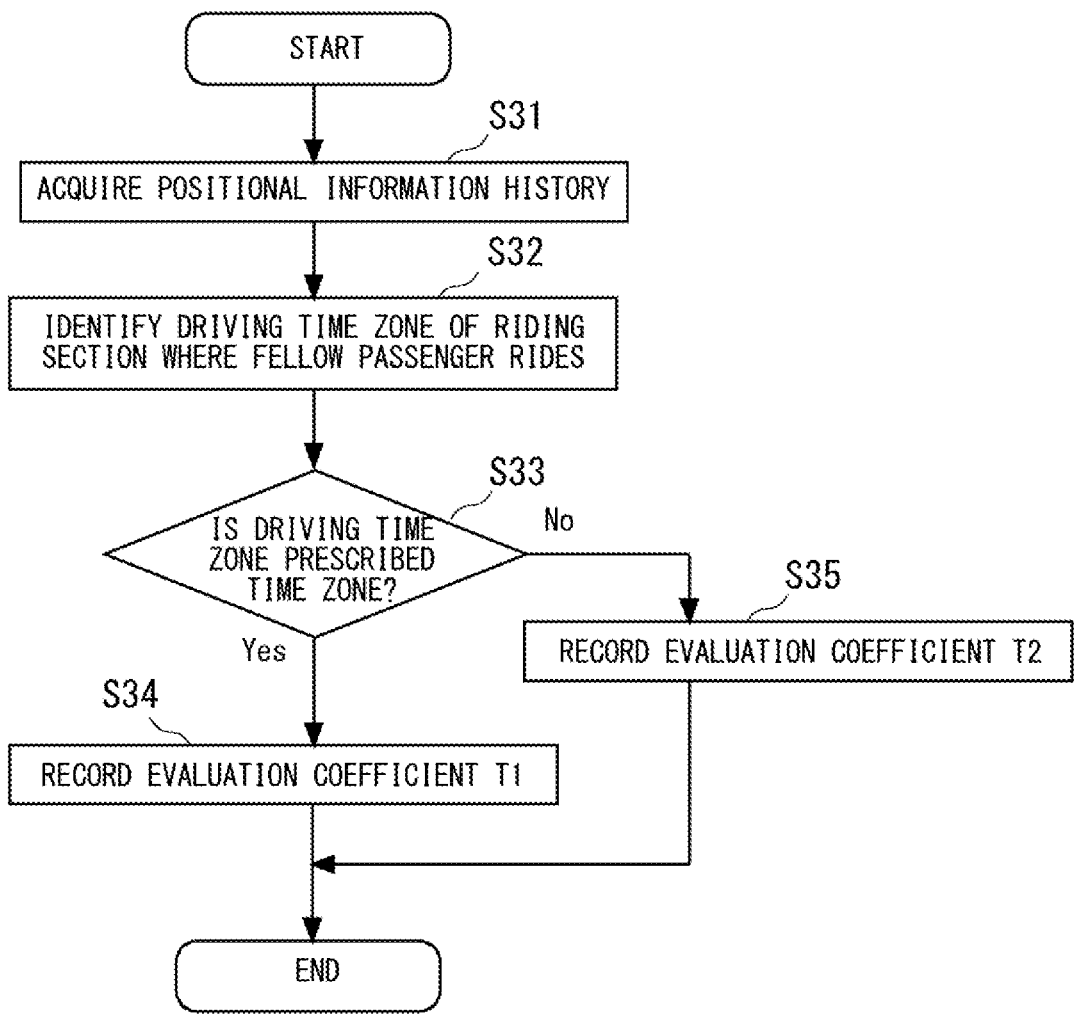
FIG. 14 is a flowchart illustrating an example of calculation processing of coefficients for evaluating driving time zone.

Next, processing of FIG. 14 will be described. FIG. 14 is a flowchart illustrating an example of calculation processing of coefficients for evaluating the driving time zone. Through the processing of FIG. 14, the evaluation coefficients corresponding to the time zones at which the riding section of the fellow passenger riding on the vehicle is driven are calculated. The processing of FIG. 14 is executed for each fellow passenger sharing a ride on the vehicle 10.

In the flowchart of FIG. 14, the start of processing is similar to the case of FIG. 13. The support server 300 identifies the route traveling information table corresponding to the reservation ID registered in the ridesharing management DB 38 based on the reservation ID notified from the onboard apparatus 100. The support server 300 acquires the positional information history from the identified route traveling information table (S31).

The support server 300 identifies the driving time zone of the riding section where the fellow passenger rode on the vehicle based on the acquired positional information history (S32). The driving time zone is identified based on the fellow-passenger ID. The support server 300 identifies the positional information of the riding point where the fellow-passenger ID and the riding identifier are recorded and the positional information of the alighting point where the fellow-passenger ID and the alighting identifier are recorded from the positional information history, for example. Then, the driving time zone traveled with the fellow passenger having the fellow passenger ID riding on the vehicle is identified from the time information associated with the positional information of the riding point and the positional information of the alighting point. The identified driving time zone is forwarded to processing of S33.

In the processing of S33, the support server 300 determines whether or not the driving time zone is a prescribed time zone. Note here that the prescribed time zone is a time zone where it is assumed that the driver needs to light up the headlight. An example of such time zone may be nighttime from sunset till sunrise. Further, the prescribed time zone may be a time zone where it is assumed to be unnecessary to light up the headlight. An example of such time zone may be daytime from sunrise till sunset. The support server 300 may read out the information regarding the prescribed time zone stored in advance in the auxiliary memory 303 or the like to determine the information as a threshold value for determining the driving time zone. In the explanations hereinafter, the prescribed time zone is assumed as the time zone where the driver of the vehicle 10 needs to light up the headlight.

When determining that the riding time zone belongs to the prescribed time zone ("Yes" in S33), the support server 300 shifts to processing of S34. In the meantime, when determining that the riding time zone does not belong to the prescribed time zone ("No" in S33), the support server 300 shifts to processing of S35.

In the processing of S34, the support server 300 records an evaluation coefficient T1 in the ridesharing management DB 38. In the processing of S35, the support server 300 records an evaluation coefficient T2 in the ridesharing management DB 38. Note here that the evaluation coefficients T1 and T2 are the coefficients for giving an extra to the points given to the driver according to the riding time zone, for example. As an example, the coefficient values of 1 or larger such as the evaluation coefficient T1 of "1.1 (extra of 10%)" and the evaluation coefficient T2 of "1.0" may be used. That is, in the time zone assumed to need lighting up of the headlight, an extra point rate given to the driver becomes relatively high. The evaluation coefficients T1 and T2 are stored in the time zone sub-field of the point management information table. After the processing of S34 or S35, the processing illustrated in FIG. 14 is ended.

Through the above processing, the support server 300 can identify the driving time zone of the riding section where the fellow passenger rode on the vehicle based on the positional information notified from the onboard apparatus 100. When the identified time zone belongs to the time zone assumed to need lighting up of the headlight, the support server 300 can calculate the coefficient for adding an extra to the points to be given to the driver. The support server 300 can reflect the evaluation of the driving time zone where ridesharing is provided in the points to be given to the driver for each riding section where the fellow passenger rode.

Note that there may be assumed a case where the time zone of the riding section includes the time zone assumed to need no lighting up of the headlight and the time zone assumed to need lighting up of the headlight. In such case, after identifying the driving period of the riding section belonging to each of the time zones, the evaluation coefficients T1 and T2 distributed proportionally according to each of the driving periods may be added. For example, provided that the driving period of the time zone assumed to need no lighting up of the headlight is "Ta" and the driving period of the time zone assumed to need lighting up of the headlight is "Tb", the calculated coefficient is "(T1×Ta/(Ta+Tb))+(T2×Tb/(Ta+Tb))". Further, it is also possible to compare the lengths of the driving period "Ta" and the driving period "Tb", and calculate the evaluation coefficient by giving priority to the time zone belonging to the longer driving period.

Figure 15:
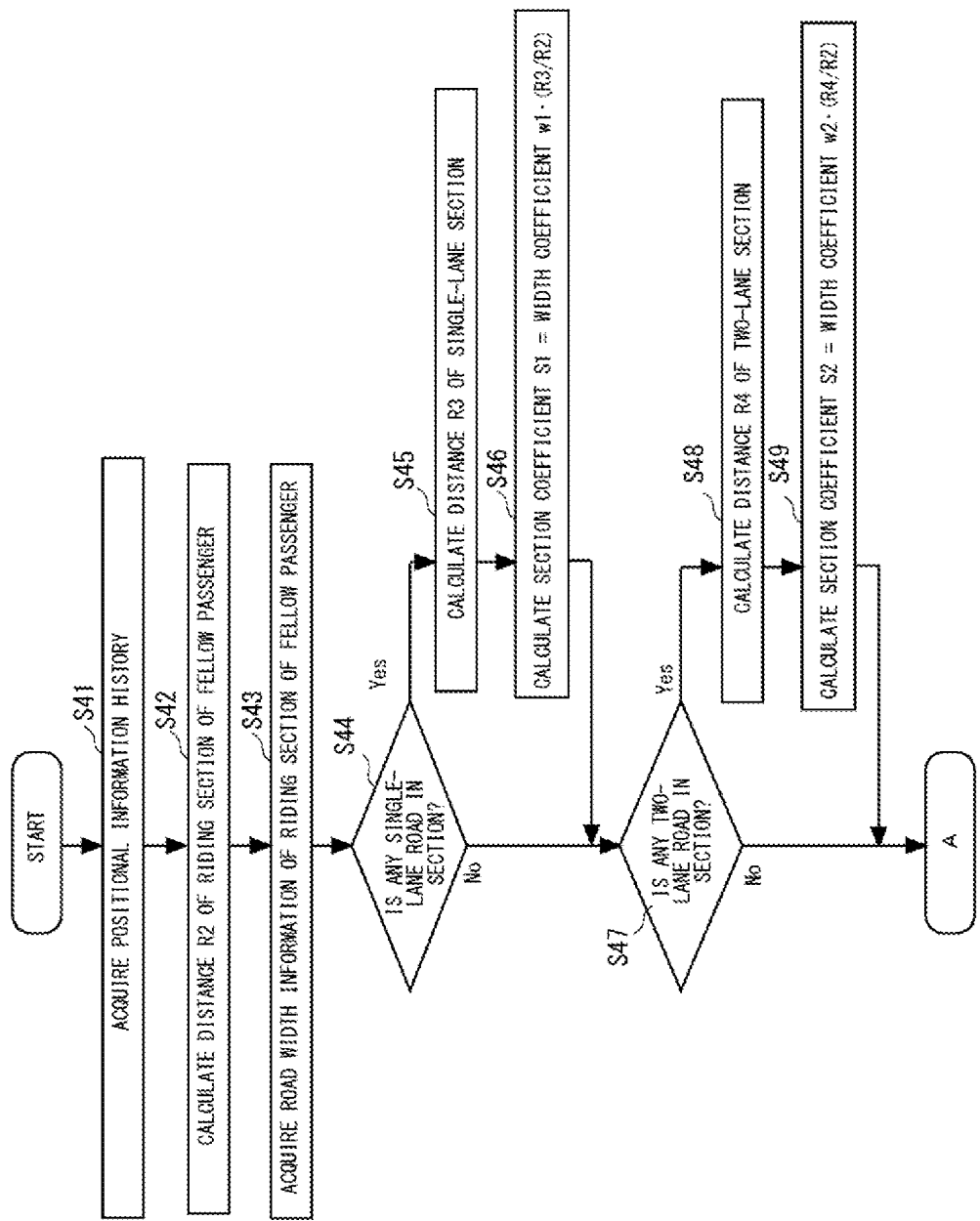
FIG. 15 is a flowchart illustrating an example of calculation processing of coefficients for evaluating road width.
Figure 16:
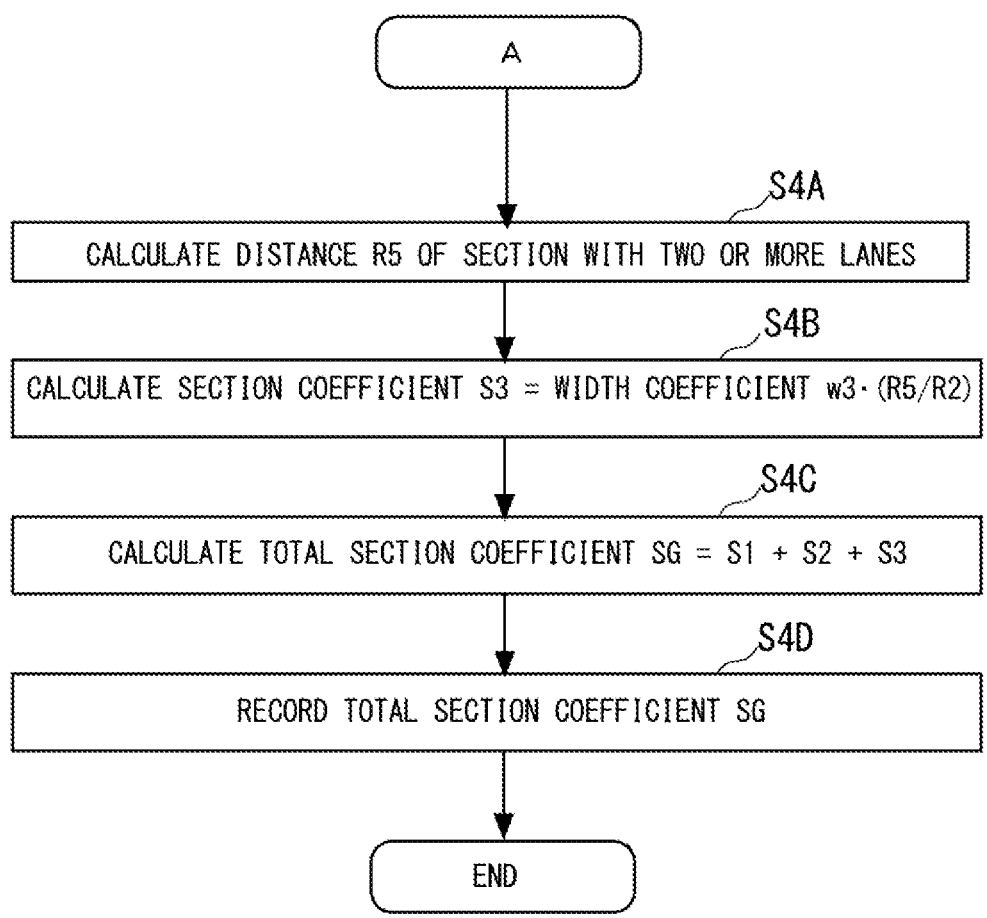
FIG. 16 is a flowchart illustrating an example of calculation processing of coefficients for evaluating road width.

Next, processing of FIG. 15 to FIG. 16 will be described. FIG. 15 to FIG. 16 are flowcharts illustrating an example of calculation processing of coefficients for evaluating the road width. Through the processing of FIG. 15 to FIG. 16, the evaluation coefficients for the driver corresponding to the road width of the riding section where the fellow passenger rode are calculated. The processing of FIG. 15 to FIG. 16 is executed for each fellow passenger sharing a ride on the vehicle 10. Note that the processing from FIG. 15 to FIG. 16 is an example of the processing for determining the width of the road by the number of lanes based on the positional information history notified from the onboard apparatus 100 and the map information DB 37.

In the flowchart of FIG. 15, the start of the processing is similar to the case of FIG. 13. Further, processing of S41 is similar to the processing of S21 in FIG. 13 and the processing of S42 is similar to the processing of S23 in FIG. 13, so that explanations thereof are omitted. The distance R2 of the riding section calculated in the processing of S42 is temporarily stored in a prescribed area of the main memory 302.

The support server 300 refers to the map information DB 37 and acquires the road width corresponding to the riding section of the fellow passenger (S43). The support server 300 acquires lane information indicating the property of the road in the riding section as the road width information, for example, and shifts to processing of S44.

In the processing of S44, the support server 300 determines whether or not there is a single-lane road in the riding section. When there is a single-lane road in the riding section ("Yes" in S44), the support server 300 shifts to processing of S45. In the meantime, when there is no single-lane road in the riding section ("No" in S44), the support server 300 shifts to processing of S47.

In the processing of S45, the support server 300 calculates distance R3 of a single-lane road section. The support server 300 calculates the distance R3 of the single-lane road section in the riding section from the traveling route of the riding section and the map data of the map information DB 37, for example. Note that when there are two or more single-lane road sections within the riding section, the distance of each of the single-lane road sections is calculated and added up to acquire the distance R3. The calculated distance R3 of the single-lane road section is forwarded to processing of S46.

In the processing of S46, the support server 300 calculates a section coefficient S1. Note here that the section coefficient S1 is a coefficient for evaluating the driving on the single-lane road in the riding section. An extra is added to the points to be given to the driver driving the single-lane road according to the coefficient. The section coefficient S1 is calculated by a relational expression of "width coefficient w1×(R3/R2)", for example. Note here that the width coefficient w1 is a weight coefficient of 1 or larger indicating the difficulty of driving through the single-lane road, for example. The calculated section coefficient S1 is forwarded to processing of S4C.

In the processing of S47, the support server 300 determines whether or not there is a two-lane road in the riding section. When there is a two-lane road in the riding section ("Yes" in S47), the support server 300 shifts to processing of S48. In the meantime, when there is no two-lane road in the riding section ("No" in S47), the support server 300 shifts to processing of S4A.

In the processing of S48, the support server 300 calculates distance R4 of the two-lane road section. Calculation of the distance R4 of the two-lane road section is performed in a similar manner to that of the calculation of the distance R3 of the single-lane road section (S45). The calculated distance R4 of the two-lane road section is forwarded to processing of S49.

In the processing of S49, the support server 300 calculates a section coefficient S2. Note here that the section coefficient S2 is the coefficient for evaluating the driving on the two-lane road in the riding section. An extra is added to the point to be given to the driver driving on the two-lane road according to the section coefficient S2. The section coefficient S2 is calculated by a relational expression of "width coefficient w2×(R4/R2)", for example. The width coefficient w2 is a weight coefficient of 1 or larger indicating the difficulty of driving through the two-lane road, for example. The calculated section coefficient S2 is forwarded to processing of S4C.

In the processing of S4A in the flowchart of FIG. 16, the support server 300 calculates distance R5 of a section with over two lanes. Calculation of the distance R5 of the section with over two lanes is performed in a similar manner to that of the calculation of the distance R3 of the single-lane road section (S45). When the distance R3 and the distance R4 are calculated in the processing of S45 and S48, the distance R5 may be acquired by using the distance R2 calculated in the processing of S42. The distance R5 is calculated by a relational expression of "R2−(R3+R4)". The calculated distance R5 of the section of with over two lanes is forwarded to processing of S4B.

In the processing of S4B, the support server 300 calculates a section coefficient S3. The section coefficient S3 is the coefficient for evaluating the driving of the section with over two lanes in the riding section. An extra is added to the points to be given to the driver driving the section with over two lanes according to the section coefficient S3. The section coefficient S3 is calculated by a relational expression of "width coefficient w3×(R5/R2)", for example. The width coefficient w3 is a weight coefficient of 1 or larger indicating the difficulty of driving through the section with over two lanes, for example. The calculated section coefficient S3 is forwarded to processing of S4C.

In the processing of S4C, the support server 300 calculates a total section coefficient SG. When the section coefficient S1, the section coefficient S2, and the section coefficient S3 are forwarded, for example, the total section coefficient SG is calculated by adding those coefficients. Through the processing of S4C, the evaluation coefficient for the driver corresponding to the road width attribute forming the riding section of the fellow passenger can be calculated. The support server 300 records the calculated total section coefficient SG in the ridesharing management DB 38 (S4D). The total section coefficient SG is stored in the road width sub-field of the point management information table. After the processing of S4D, the processing of FIG. 15 to FIG. 16 is ended.

Through the above processing, the support server 300 can identify the road width information of the riding section where the fellow passenger rode based on the positional information notified from the onboard apparatus 100. When the identified road width information includes a single-lane road, the support server 300 can calculate the section coefficient acquired by multiplying the weight coefficient indicating the difficulty of driving through the single-lane road and the ratio of the distance of the single-lane road section with respect to the distance of the riding section. Similarly, the support server 300 can calculate each of the section coefficient corresponding to the two-lane road section and the section coefficient corresponding to the section with over two lanes. The support server 300 can calculate the total section coefficient corresponding to the riding section by adding each of the section coefficients corresponding to the road width. The calculated total section coefficient is reflected as an extra coefficient in the points to be given to the driver having run on the riding section by the vehicle 10. The support server 300 becomes capable of giving the driver the points according to the road width information by taking the road width information of the riding section as the evaluation condition.

In a case where the onboard apparatus 100 includes the camera 108A and the videos in the vehicle traveling direction at the time of traveling on the route can be acquired, it is possible to identify the attribute information indicating the road width of the riding section based on the history of the videos. The support server 300 can identify the segment of the number of lanes by recognizing vehicles, pedestrians, curbs on the shoulder of the road, white lines, and the like through pattern matching or the like performed on the frame images captured at a frame period. Further, for example, the support server 300 can estimate the distance to curbs, miscellaneous trees or the like on the shoulder of the road based on differences between the frame images captured at the frame period. Through executing the processing from S44 to S4D based on the road lane information and distance information estimated from the video history of the camera 108A, the support server 300 becomes capable of giving the points according to the road width information of the riding section to the driver.

Figure 17:
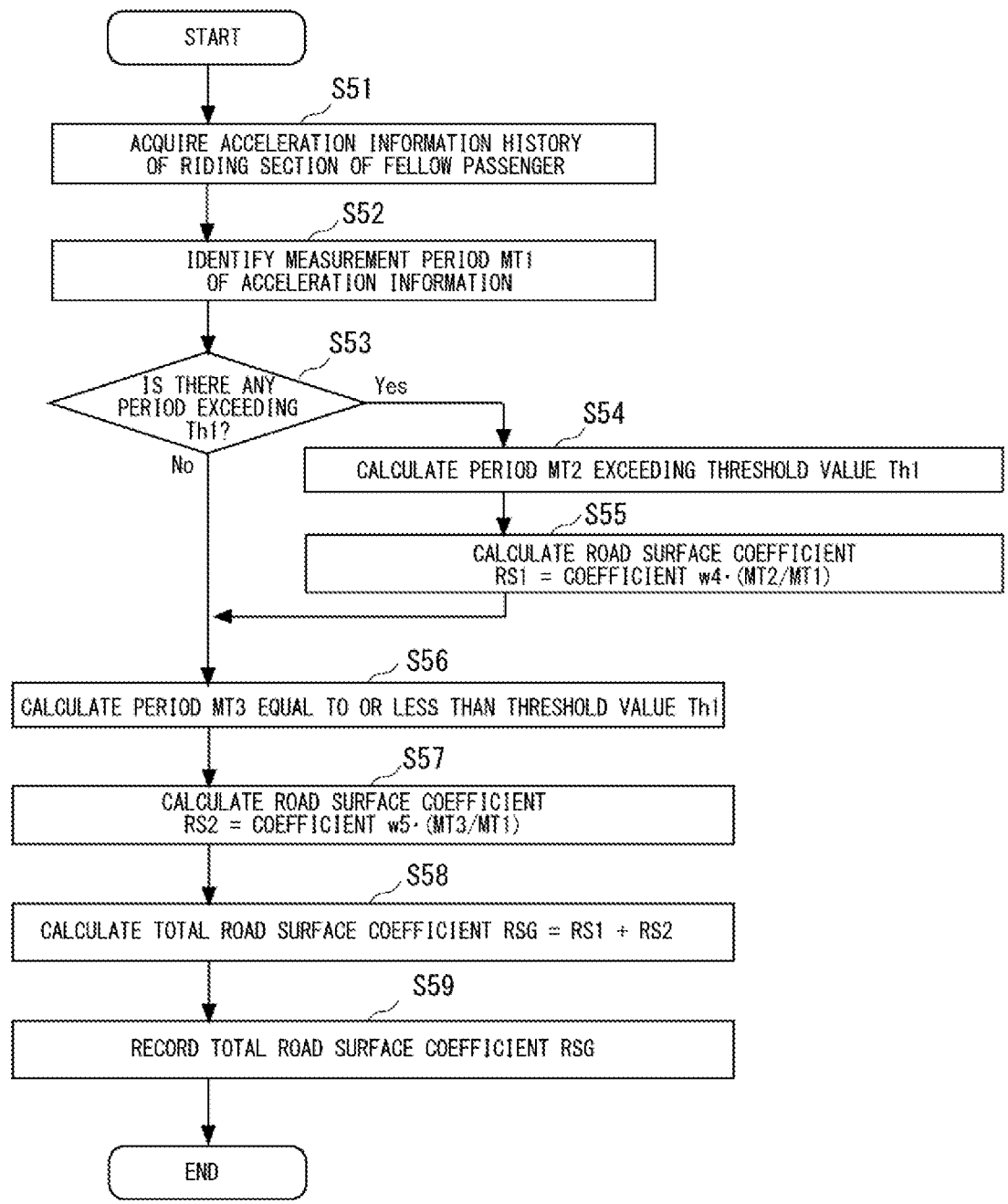
FIG. 17 is a flowchart illustrating an example of calculation processing of coefficients for evaluating a paving state of a road surface.

Next, the processing of FIG. 17 will be described. FIG. 17 is a flowchart illustrating an example of calculation processing of the coefficients for evaluating a paving state of road surface. Through the processing of FIG. 17, the evaluation coefficients for the driver corresponding to the paving state of the road surface of the riding section where the fellow passenger rides are calculated. The processing of FIG. 17 is executed for each fellow passenger sharing a ride on the vehicle 10. Note that the processing of FIG. 17 is an example of the processing executed based on the acceleration information history notified from the onboard apparatus 100.

In the flowchart of FIG. 17, the start of the processing is similar to the case of FIG. 13. The support server 300 searches the ridesharing management DB 38 by using the reservation ID included in a point calculation request from the onboard apparatus 100 as a search key to identify the route traveling information table corresponding to the reservation ID. The support server 300 acquires the acceleration information history corresponding to the riding section where the fellow passenger rode from the identified route traveling information (S51). For example, the support server 300 acquires the acceleration information history in a row including the fellow passenger in the persons on board based on the fellow-passenger ID. The support server 300 temporarily stores the acquired acceleration information history in a prescribed area of the main memory 302, and shifts to processing of S52.

In the processing of S52, the support server 300 identifies a measurement period MT1 of the acceleration information corresponding to the riding section based on the acquired acceleration information history. The measurement period MT1 is identified from start time and end time of the time information recorded in the acceleration information history corresponding to the riding section, for example. The support server 300 temporarily stores the identified measurement period MT1 in a prescribed area of the main memory 302, and shifts to processing of S53.

In the processing of S53, the support server 300 determines whether or not there is a period where the acceleration value measured in the acceleration information history exceeds a threshold value Th1. Note here that the threshold value Th1 is a threshold value for determining the degree of roughness of the paving state of the road surface. When exceeding the threshold value Th1, it is determined that the paving state of the road surface is an unpaved state with a high degree of roughness. In the meantime, when not exceeding the threshold value Th1, it is determined as not being in an unpaved state. When there is a period where the acceleration value measured in the acceleration information history corresponding to the riding section exceeds the threshold value Th1 ("Yes" in S53), the support server 300 shifts to processing of S54. In the meantime, when there is no such period where the acceleration value measured in the acceleration information history corresponding to the riding section exceeds the threshold value Th1 ("No" in S53), the support server 300 shifts to processing of S56.

In the processing of S54, the support server 300 calculates a period MT2 where the acceleration value exceeding the threshold value Th1 is measured. The period MT2 is calculated based on the time information recorded in the acceleration information history. When there are two or more periods exceeding the threshold value Th1, the period MT2 may be acquired by calculating and adding each of such measured periods. The calculated period MT2 is forwarded to processing of S55.

In the processing of S55, the support server 300 calculates a road surface coefficient RS1. The road surface coefficient RS1 is a coefficient for evaluating the driving under a road surface state where the acceleration value exceeding the threshold value Th1 is measured. According to the coefficient, an extra is added to the points to be given to the driver driving the road surface section with a high degree of roughness determined as being in an unpaved state. The road surface coefficient RS1 is calculated by a relational expression of "coefficient $w4 \times (MT2/MT1)$", for example. Note here that the coefficient w4 is a weight coefficient of 1 or larger indicating the difficulty of driving in the road surface section in the unpaved state with a high degree of roughness, for example. The calculated road surface coefficient RS1 is forwarded to processing of S58.

In the processing of S56, the support server 300 calculates a period MT3 where the acceleration value equal to or less than the threshold value Th1 is measured. Calculation of the period MT3 is similar to the case of the period MT2. The support server 300 forwards the calculated period MT3 to processing of S57.

In the processing of S57, the support server 300 calculates a road surface coefficient RS2. The road surface coefficient RS2 is a coefficient for evaluating the driving under a road surface state where the acceleration value equal to or less than the threshold value Th1 is measured. According to the coefficient, an extra is added to the points to be given to the driver driving the road surface section determined as being in a paved state. The road surface coefficient RS2 is calculated by a relational expression of "coefficient $w5 \times (MT3/MT1)$", for example. The coefficient w5 is a weight coefficient of 1 or larger indicating the difficulty of driving in the road surface section in the paved state, for example. The calculated road surface coefficient RS2 is forwarded to processing of S58.

In the processing of S58, the support server 300 calculates a total road surface coefficient RSG. When the road surface coefficients RS1 and RS2 are forwarded, for example, the total road surface coefficient RSG is calculated by adding those coefficients. Through the processing of S58, the evaluation coefficient for the driver corresponding to the paving state of the road surface as the attribute of the road in the riding section of the fellow passenger can be calculated. The support server 300 records the calculated total road surface coefficient RSG in the ridesharing management DB 38 (S59). The total road surface coefficient RSG is stored in the road surface sub-field of the point management information table. After the processing of S59, the processing of FIG. 17 is ended.

Through the above processing, the support server 300 can identify the paving state of the road surface in the riding section where the fellow passenger rode based on the acceleration information notified from the onboard apparatus 100. When the identified paving state of the road surface includes the section determined as being in an unpaved state, the support server 300 can calculate the road surface coefficient acquired by multiplying the weight coefficient indicating the difficulty of driving on the unpaved road and the ratio occupying the unpaved section with respect to the riding section. Similarly, the support server 300 can calculate the road surface coefficient with respect to the road section of the paved state. The support server 300 can calculate the total road surface coefficient corresponding to the riding section by adding each of the road surface coefficients corresponding to the road surface states. The calculated total road surface coefficient is reflected as an extra coefficient in the points to be given to the driver having run on the riding section by the vehicle 10. The support server 300 becomes capable of giving the points according to the paving state by taking the paving state of the riding section as the evaluation condition.

In the processing of FIG. 17, it may also give the points (fixed points defined in advance) for driving on the unpaved road provided that there is a period exceeding the prescribed threshold value. It is because operations (gear shifting, accelerator pedal operation, braking operation) for keeping the steering and the vehicle speed properly are needed at the time of running on the unpaved road.

In a case where the onboard apparatus 100 includes the road surface sensor 108D and the information indicating the roughness of the road surface and the road surface state in the riding section is acquired, it is possible to identify the attribute information indicating the paving state of the riding section based on the history of the information. Through executing the processing of FIG. 17 based on the identified paving state history of the riding section, the support server 300 becomes capable of giving the points according to the paving state of the riding section to the driver.

Further, in a case where the onboard apparatus 100 includes the camera 108A and the videos of the road surface state in the riding section are acquired, it is possible to identify the attribute information indicating the paving state of the riding section based on the history of the videos. The support server 300 can estimate whether the road surface state in the riding section is the paved road surface or the unpaved road surface through pattern matching or the like performed on the frame images captured at a frame period, for example. Through executing the processing of FIG. 17 based on the road surface state in the riding section estimated from the video history of the camera 108A, the support server 300 becomes capable of giving the points according to the paving state of the riding section to the driver.

Figure 18:
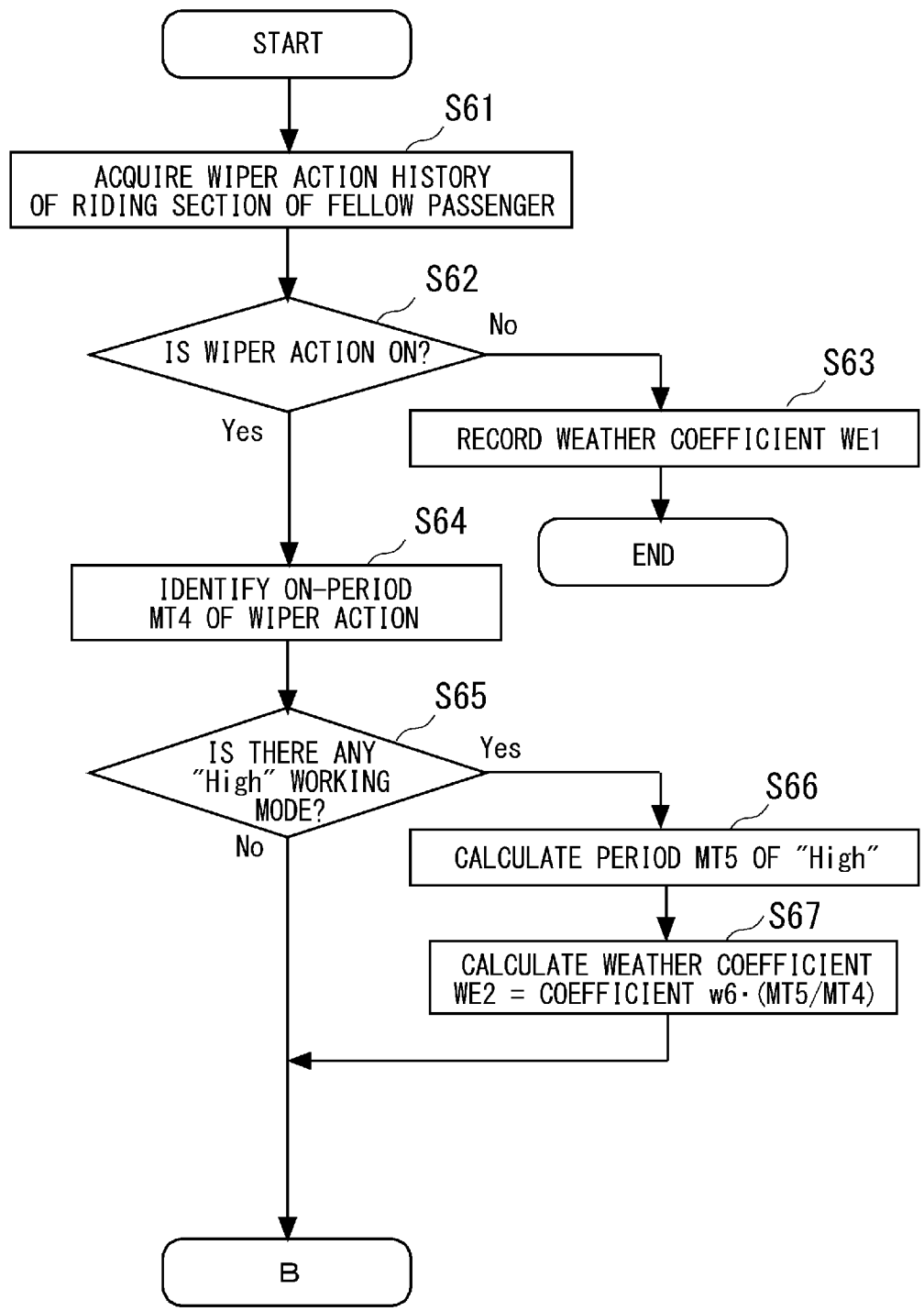
FIG. 18 is a flowchart illustrating an example of calculation processing of coefficients for evaluating weather condition.
Figure 19:
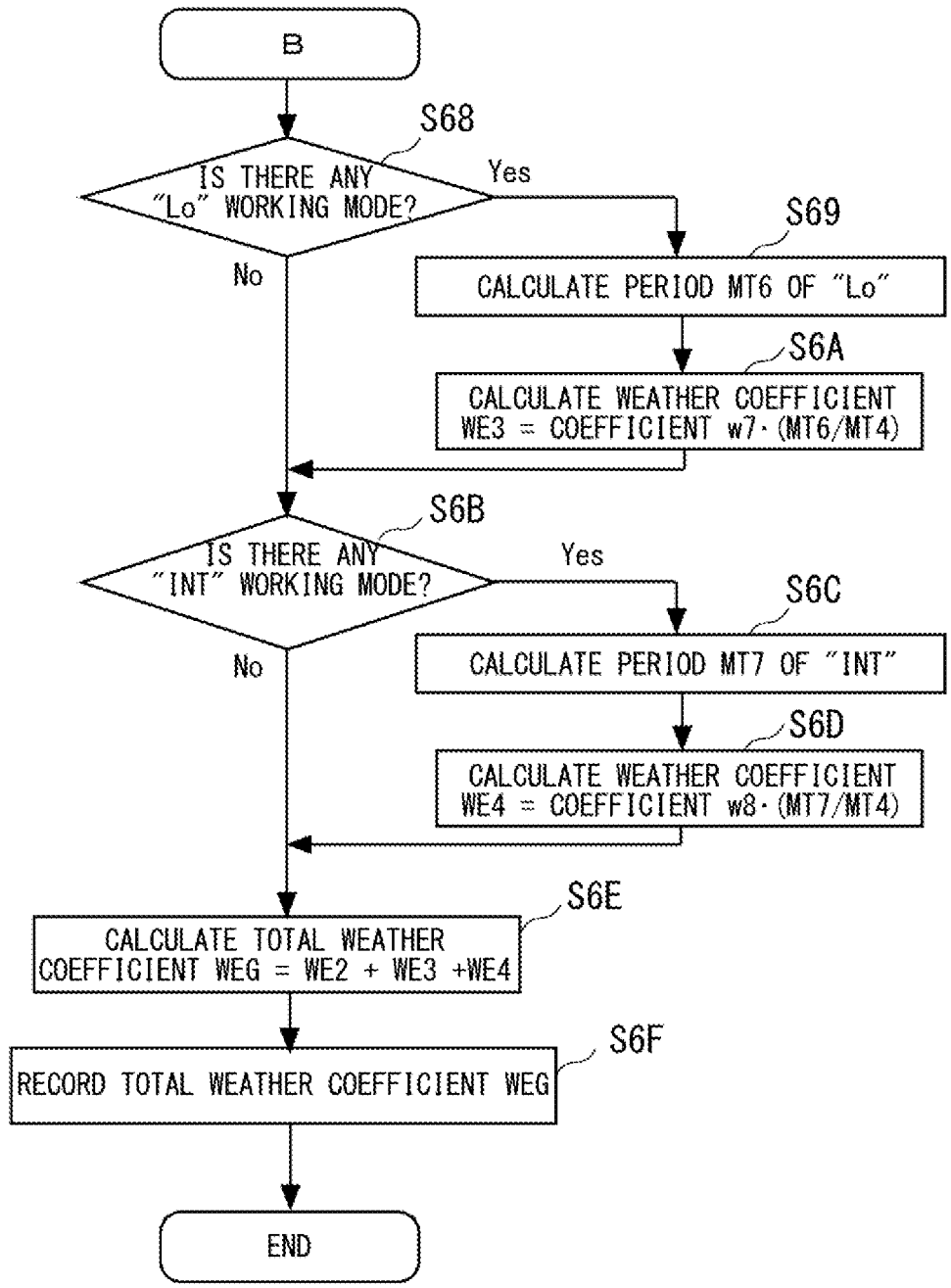
FIG. 19 is a flowchart illustrating an example of calculation processing of coefficients for evaluating weather condition.

Next, processing of FIG. 18 to FIG. 19 will be described. FIG. 18 to FIG. 19 are flowcharts illustrating an example of calculation processing of coefficients for evaluating the weather condition. Through the processing of FIG. 18 to FIG. 19, the evaluation coefficients for the driver corresponding to the weather condition when traveling in the riding section is calculated. The processing of FIG. 18 to FIG. 19 is executed for each fellow passenger sharing a ride on the vehicle 10. Note that the processing from FIG. 18 to FIG. 19 is an example of the processing based on a wiper action history notified from the onboard apparatus 100. In the wiper action history, recorded along with the time information are the information indicating on/off of the wiper action and the working modes ("INT", "Lo", "High") when the wiper action is on, for example.

In the flowchart of FIG. 18, the start of the processing is similar to the case of FIG. 13. The support server 300 searches the ridesharing management DB 38 by using the reservation ID included in a point calculation request from the onboard apparatus 100 as a search key to identify the route traveling information table corresponding to the reservation ID. The support server 300 acquires the wiper action history corresponding to the riding section where the fellow passenger rode from the identified route traveling information (S61). For example, the support server 300 acquires the wiper action history in a row including the fellow passenger in the persons on board based on the fellow-passenger ID. The support server 300 temporarily stores the acquired wiper action history in a prescribed area of the main memory 302, and shifts to processing of S62.

In the processing of S62, the support server 300 determines whether or not the information indicating that the wiper action is on is recorded in the wiper action history. When the information indicating that the wiper action is on is recorded in the wiper action history ("Yes" in S62), the support server 300 shifts to processing of S64. In the meantime, when the information indicating that the wiper action is on is not recorded in the wiper action history ("No" in S62), the support server 300 shifts to processing of S63.

In the processing of S63, the support server 300 records, in the ridesharing management DB 38, a weather coefficient WE1 that is the evaluation coefficient corresponding to the weather condition with no record of information indicating that the wiper action is on in the wiper action history. The weather coefficient WE1 is stored in the weather sub-field of the point management information table. The weather coefficient WE1 is a weight coefficient of 1 or larger, for example. Through the processing of S63, the support server 300 can calculate the evaluation coefficient for the driver corresponding to the driving in the riding section under the weather condition with no record indicating that the wiper action is on. After the processing of S63, the processing of FIG. 18 to FIG. 19 is ended.

In the processing of S64, the support server 300 calculates an on-period MT4 of the wiper action. The on-period MT4 is calculated based on the time information recorded in the wiper action history. When there are two or more on-periods of the wiper action, the on-period MT4 of the wiper action may be acquired by calculating and adding each of the on-periods. The support server 300 temporarily stores the calculated on-period MT4 in a prescribed area of the main memory 302, and shifts to processing of S65.

In the processing of S65, the support server 300 determines whether or not the information indicating the "High" working mode when the wiper action is on is recorded in the wiper action history. Through the processing, it is possible to determine whether or not the driving in the riding section is done under the weather condition (for example, weather with relatively a great amount of precipitation such as torrential rainfalls or heavy rainfalls) encouraging selection of the "High" working mode for the wiper action. When there is a record of the information indicating the "High" working mode when the wiper action is on ("Yes" in S65), the support server 300 shifts to processing of S66. In the meantime, when there is no record of the information indicating the "High" working mode when the wiper action is on ("No" in S65), the support server 300 shifts to processing of S68.

In the processing of S66, the support server 300 calculates a period MT5 of the "High" working mode. The period MT5 is calculated based on the time information recorded in the wiper action history. When there are two or more periods of the "High" working mode, the period MT5 may be acquired by calculating and adding each of the working periods of the "High" working mode. The support server 300 forwards the calculated period MT5 to processing of S67.

In the processing of S67, the support server 300 calculates a weather coefficient WE2. The weather coefficient WE2 is the coefficient for evaluating the driving under the weather condition encouraging selection of the "High" working mode for the wiper action. An extra is added to the points for the driver driving the vehicle 10 under the weather condition according to the coefficient. The weather coefficient WE2 is calculated by a relational expression of "coefficient w6× (MT5/MT4)", for example. Note here that the coefficient w6 is a weight coefficient of 1 or larger indicating the difficulty of driving under the weather condition encouraging selection of the "High" working mode for the wiper action, for example. The calculated weather coefficient WE2 is forwarded to processing of S6E.

In the processing of S68 of the flowchart illustrated in FIG. 19, the support server 300 determines whether or not the information indicating the "Lo" working mode when the wiper action is on is recorded in the wiper action history. Through the processing, it is possible to determine whether or not the driving in the riding section is done under the weather condition (for example, weather with a smaller amount of precipitation than "High" and greater than "INT") encouraging selection of "Lo" working mode for the wiper action. When there is a record of the information indicating the "Lo" working mode ("Yes" in S68), the support server 300 shifts to processing of S69. In the meantime, when there is no record of the information indicating the "Lo" working mode ("No" in S68), the support server 300 shifts to processing of S6B.

Each of the processing of S69 and the processing of S6A is performed in a similar manner to the processing (S66, S67) of the "High" working mode. A period MT6 of the "Lo" working mode is calculated in the processing of S69, while a weather coefficient WE3 of the "Lo" working mode is calculated in the processing of S6A. The weather coefficient WE3 is a coefficient for evaluating the driving under the weather condition encouraging selection of the "Lo" working mode for the wiper action. An extra is added to the points for the driver driving the vehicle 10 under the weather condition according to the coefficient. The weather coefficient WE3 is calculated by a relational expression of "coefficient w7×(MT6/MT4)", for example. Note here that the coefficient w7 is a weight coefficient of 1 or larger indicating the difficulty of driving under the weather condition encouraging selection of the "Lo" working mode for the wiper action, for example. The calculated weather coefficient WE3 is forwarded to processing of S6E.

In the processing of S6B, the support server 300 determines whether or not the information indicating the "INT" working mode when the wiper action is on is recorded in the wiper action history. Through the processing, it is possible to determine whether or not the driving in the riding section is done under the weather condition (for example, weather with relatively a smaller amount of precipitation than "Lo", such as light rain or fog with a view) encouraging selection of the "INT" working mode for the wiper action. When there is a record of the information indicating the "INT" working mode ("Yes" in S6B), the support server 300 shifts to processing of S6C. In the meantime, when there is no record of the information indicating the "INT" working mode ("No" in S6B), the support server 300 shifts to processing of S6E.

Each of the processing of S6C and the processing of S6D is performed in a similar manner to the processing (S66, S67) of the "High" working mode. A period MT7 of the "INT" working mode is calculated in the processing of S6C, while a weather coefficient WE4 of the "INT" working mode is calculated in the processing of S6D. The weather coefficient WE4 is a coefficient for evaluating the driving under the weather condition encouraging selection of the "INT" working mode for the wiper action. An extra is added to the points for the driver driving the vehicle 10 under the weather condition according to the coefficient. The weather coefficient WE4 is calculated by a relational expression of "coefficient w8×(MT7/MT4)", for example. Note here that the coefficient w8 is a weight coefficient of 1 or larger indicating the difficulty of driving under the weather condition encouraging selection of the "INT" working mode for the wiper action, for example. The calculated weather coefficient WE4 is forwarded to processing of S6E.

In the processing of S6E, the support server 300 calculates a total weather coefficient WEG. When the weather coefficients WE2, WE3, and WE4 are forwarded, for example, the total weather coefficient WEG is calculated by adding those coefficients. Through the processing of S6E, the evaluation coefficient for the driver corresponding to the weather condition when traveling in the riding section can be calculated. The support server 300 records the calculated total weather coefficient WEG in the ridesharing management DB 38 (S6F). The total weather coefficient WEG is stored in the weather sub-field of the point management information table. After the processing of S6F, the processing of FIG. 18 to FIG. 19 is ended.

Through the above processing, the support server 300 can identify the weather condition when traveling in the riding section where the fellow passenger rode based on the wiper action history notified from the onboard apparatus 100. When the weather condition when traveling in the riding section does not need a wiper action, the support server 300 can calculate the weather coefficient acquired according to the weather condition. Further, when the weather condition when traveling in the riding section needs a wiper action, the support server 300 can calculate the weather coefficient acquired according to the type of the working mode, for example. The support server 300 can calculate the weather coefficient acquired by multiplying the weight coefficient indicating the difficulty of driving under the weather condition encouraging selection of the "High" working mode for the wiper action and the ratio of working mode occupying the working period when the wiper action is on. Similarly, the support server 300 can calculate the weather coefficients for the weather conditions where the "Lo" working mode and the "INT" working mode are selected.

When the weather condition when traveling in the riding section needs the wiper actions of a plurality of types of working modes, the support server 300 can calculate a total weather coefficient by adding the weather coefficients according to the types of the working modes. The calculated total weather coefficient is reflected as an extra coefficient in the points to be given to the driver having run on the riding section by the vehicle 10. The support server 300 becomes capable of giving the points according to the weather condition by taking the amount of the precipitation estimated from on/off of the wiper action and the types of the working mode as the evaluation condition.

In the processing of FIG. 18 to FIG. 19, it may also give the points (fixed points defined in advance) for driving in the riding section provided that the wiper action is on. Further, it may also give the fixed points defined in advance for each type of working mode provided that there is selection of the working mode when the wiper action is on.

In a case where the onboard apparatus 100 includes the rain sensor 108B and the information indicating existence of a rainfall and intensity of the rainfall is acquired, it is possible to identify the weather condition when traveling in the riding section based on the history of the information. Through executing the processing corresponding to FIG. 18 to FIG. 19 based on the identified weather condition, the support server 300 can give the points according to the weather condition when driving in the riding section to the driver. Further, in a case where the onboard apparatus 100 includes the camera 108A, it is possible to estimate existence of a rainfall, intensity of the rainfall, and the like based on the history of the videos of the camera. The support server 300 may execute determination processing corresponding to FIG. 18 to FIG. 19 based on the existence of a rainfall, intensity of the rainfall, and the like estimated through pattern matching performed on the frame images or from differences between the frame images, for example, and give the driver the points according to the weather condition.

Figure 20:
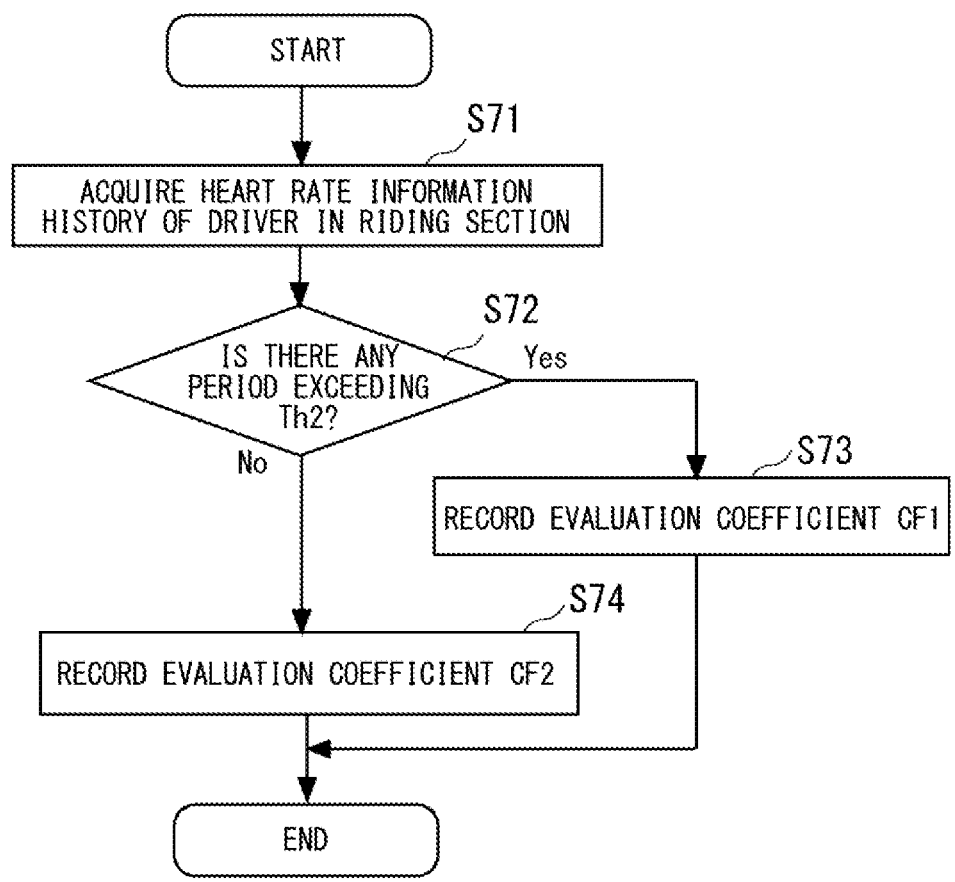
FIG. 20 is a flowchart illustrating an example of calculation processing of coefficients for evaluating biological information acquired from a driver traveling in a riding section.

Next, the processing of FIG. 20 will be described. FIG. 20 is a flowchart illustrating an example of calculation processing of the coefficient for evaluating biological information acquired from the driver traveling in the riding section. Through the processing of FIG. 20, an evaluation coefficient corresponding to the stress state of the driver in the riding section is calculated. The processing of FIG. 20 is executed for each fellow passenger sharing a ride on the vehicle 10. Note that the processing of FIG. 20 is an example of the processing executed based on the heart rate information history notified from the onboard apparatus 100.

In the flowchart of FIG. 20, the start of the processing is similar to the case of FIG. 13. The support server 300 searches the ridesharing management DB 38 by using the reservation ID included in a point calculation request from the onboard apparatus 100 as a search key to identify the route traveling information table corresponding to the reservation ID. The support server 300 acquires the heart rate information history corresponding to the riding section where the fellow passenger rode from the identified route traveling information (S71). For example, the support server 300 acquires the heart rate information history in a row including the fellow passenger in the persons on board based on the fellow-passenger ID. The support server 300 temporarily stores the acquired heart rate information history in a prescribed area of the main memory 302, and shifts to processing of S72.

In the processing of S72, the support server 300 determines whether or not there is a period where the heart rate of the driver measured exceeds a threshold value Th2 in the heart rate information history. Note here that the threshold value Th2 is a threshold value for determining whether or not the driver is in a stress state. When exceeding the threshold value Th2, it is determined that the driver running in the riding section where the fellow-passenger rides is in a stress state. In the meantime, when not exceeding the threshold value Th2, it is determined that the driver is not in a stress state. When there is a period where the heart rate of the driver exceeds the threshold value Th2 ("Yes" in S72), the support server 300 shifts to processing of S73. In the meantime, when there is not the period where the heart rate of the driver exceeds the threshold value Th2 ("No" in S72), the support server 300 shifts to processing of S74.

In the processing of S73, the support server 300 records an evaluation coefficient CF1 in the ridesharing management DB 38. In the processing of S74, the support server 300 records an evaluation coefficient CF2 in the ridesharing management DB 38. Note here that the evaluation coefficients CF1 and CF2 are coefficients for adding an extra to the points to be given to the driver according to the stress state of the driver, for example. As an example, the weight coefficient values of 1 or larger such as the evaluation coefficient CF1 of "1.2 (extra of 20%)" and the evaluation coefficient CF2 of "1.0" may be used. The evaluation coefficients CF1 and CF2 are stored in the stress sub-field of the point management information table. After the processing of S73 or S74, the processing of FIG. 20 is ended.

Through the above processing, the support server 300 can identify transitional changes in the heart rate of the driver traveled in the riding section where the fellow passenger rode based on the heart rate information notified from the onboard apparatus 100. When there is a period determined as being in a stress state in the identified transitional changes of the heart rate, the support server 300 can calculate the coefficient for adding an extra to the points to be given to the driver. The support server 300 becomes capable of giving the points according to existence of the stress state provided that, as the evaluation condition, it is determined from the transition of the heart rate that the heart rate exceeds the threshold value for determining the stress state.

In a case where the onboard apparatus 100 includes the blood pressure sensor 109B and blood pressure information of the driver driving in the vehicle traveling section is acquired, it is possible to identify transitional changes in the blood pressure of the driver based on the history of the blood pressure information. Through executing the processing from S72 to S74 based on the identified transitional changes in the blood pressure, the support server 300 can give the points according to the stress state of the driver. With the blood flow sensor 109C, the electrocardiogram sensor 109D, and the body temperature sensor 109E, it is also possible to give the points according to the stress state of the driver in a similar manner based on the transitional changes in the blood flow, the transitional changes in the electrocardiogram, and the transitional changes in the body temperature.

Figure 21:
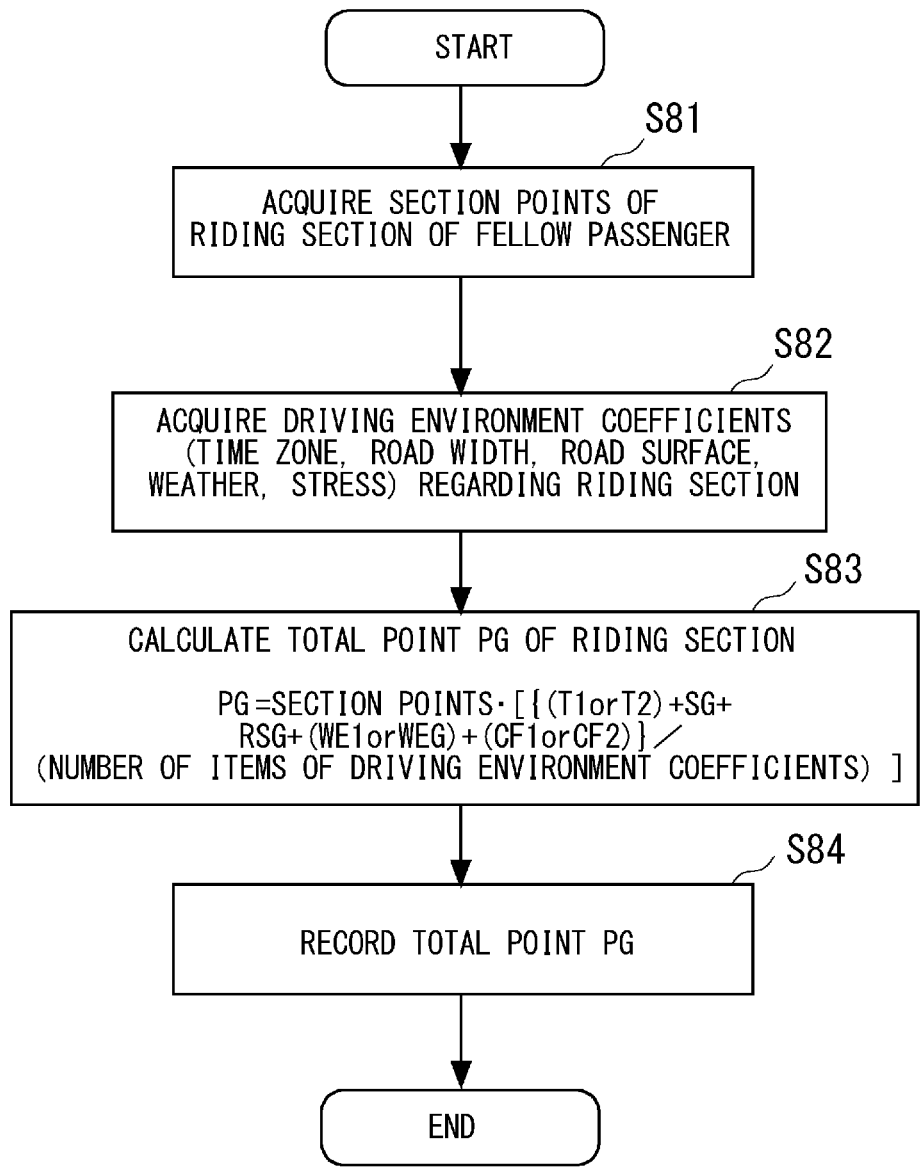
FIG. 21 is a flowchart illustrating an example of calculation processing of points given to the driver.

Next, the processing of FIG. 21 will be described. FIG. 21 is a flowchart illustrating an example of calculation processing of the points to be given to the driver. Through the processing of FIG. 21, the points in which the driving environment is reflected are calculated as the total points. The processing of FIG. 21 is executed for each fellow passenger sharing a ride on the vehicle 10. Note that the processing of FIG. 21 is an example of the processing executed for calculating the total points based on the section points and the driving environment coefficients stored in the point management information table described in FIG. 9.

In the flowchart of FIG. 21, the start of the processing is similar to the case of FIG. 13. The support server 300 searches the ridesharing management DB 38 by using the reservation ID included in a point calculation request from the onboard apparatus 100 as a search key to identify the point management information table corresponding to the reservation ID. The support server 300 acquires the section point corresponding to the riding section where the fellow passenger rode from the identified point management information (S81). The section point is acquired based on the fellow-passenger ID corresponding to the riding section. The support server 300 temporarily stores the acquired section point in a prescribed area of the main memory 302, and shifts to processing of S82.

In the processing of S82, the support server 300 acquires the driving environment coefficient corresponding to the riding section where the fellow passenger rode (S82). Through the processing of S82, each evaluation coefficient based on the acquired driving environment history based on the configuration provided by the onboard apparatus 100 is acquired. For example, acquired are the evaluation coefficient (T1/T2) according to the traveling time zone of the riding section, the evaluation coefficient (SG) according to the road width, the evaluation coefficients (RSG) corresponding to the road surface condition, the evaluation coefficient (WE1/WE2) according to the weather condition, and the evaluation coefficient (CF1/CF2) according to the stress state of the driver. The support server 300 forwards the driving environment coefficients acquired from the point management information table to processing of S83.

In the processing of S83, the support server 300 calculates total points PG corresponding to the riding section where the fellow passenger rode. The total point PG is calculated by multiplying total coefficient TG calculated based on the driving environment coefficients with the section point. In the present embodiment, the total coefficient TG is calculated by adding the evaluation coefficients calculated for each item of the driving environment and dividing the added evaluation coefficients by the number of items of the driving environment. That is, the total coefficients TG are calculated by a relational expression of "(time zone evaluation coefficient+road width evaluation coefficient+road surface evaluation coefficient+weather evaluation coefficient+stress evaluation coefficient)/(number of items of driving environment coefficients)".

The support server 300 records the total point PG calculated based on the section point and the driving environment coefficients in the ridesharing management DB 38 (S84). The total point PG is stored in the total field of the point management information table. After the processing of S84, the processing of FIG. 21 is ended.

Through the above processing, the support server 300 can calculate the points in which conditions recorded in the driving environment history are evaluated and reflected based on the driving environment history notified from the onboard apparatus 100. The support server 300 can calculate the total points acquired by reflecting the conditions indicated by the driving environment history as the extra coefficients in the section point calculated according to the travel distance of the riding section where the fellow passenger rides.

The support server 300 can calculate the points in which the evaluation values corresponding to the attribute of the road width of each riding section are reflected based on the positional information history acquired by the positional information detection unit 107 or the history of the video information captured by the camera 108A of the driving environment detection unit 108, for example. Further, the support server 300 can calculate the points in which evaluation values corresponding to the paving state of each riding section are reflected based on the history of the information indicating the road surface condition acquired by the camera 108A, the road surface sensor 108D, and the acceleration sensor 108E, for example. Similarly, the support server 300 can calculate the points in which the evaluation values corresponding to the precipitation condition of fog, rain, snow, or the like of each riding section are reflected based on the history of the information indicating the weather condition acquired by the rain sensor 108B and the wiper action detection sensor 108C, for example. Further, the support server 300 can calculate the points in which the evaluation values corresponding to the stress state of the driver of each riding section are reflected based on the history of the biological information of the driver acquired by the biological information detection unit 109, for example. Examples of the devices for detecting the biological information of the driver may be the heart rate sensor 109A, the blood pressure sensor 109B, the blood flow sensor 109C, the electrocardiogram sensor 109D, and the body temperature sensor 109E.

The support server 300 according to the present embodiment can calculate the points to be given to the driver by taking the driving environment including at least one piece of information on the road attribute like the road width and the road surface condition described above, the weather condition, and the biological information of the driver as the evaluation condition. The support server 300 according to the present embodiment makes it possible to give the points according to the difficulty of driving in accordance with the acquired driving environment, so that it is possible to perform proper evaluation of the contribution level of the driver for running on the route under such driving environment. With the present embodiment, it is possible to increase the willingness to participate in ridesharing by giving an incentive corresponding to the condition to the driver who drives the vehicle.

<First Modification>

In the first embodiment, the points in which the evaluation of the driving environment is reflected are calculated from the history of the information indicating the attributes such as the road width and the paving state of the traveling route, weather condition, and the stress state of the driver. In the first modification, restricting conditions related to driving from the fellow passenger, such as emergency traveling on a route or designation of arrival time at an alighting point may further be evaluated and reflected in the points to be given to the driver.

In ridesharing of FIG. 1, for example, it is assumed that an emergency situation occurs for the user B to travel from the departure point f to the destination point g. The user B operates the user terminal 200 to notify request information including information indicating the emergency situation to the support server 300. The support server 300 of the first modification performs matching of traveling capable of responding to such situation. Matching is performed including drivers not planning to travel at the point of notification, for example. Then, for the driver capable of responding to the emergency travel, it is possible to multiply the evaluation coefficient of 50% extra or the like and the section point, for example, to be reflected in the points to be given to the driver. The support server 300 may provide a restriction field in the point management information table illustrated in FIG. 9, for example, and store and manage the evaluation coefficient corresponding to the emergency travel in such field. Note that such evaluation coefficient may be recorded in the point management information table by taking settlement of the reservation information identified by the reservation ID as a trigger, for example.

This also applies to a case of restriction designating the arrival time. The support server 300 can multiply the evaluation coefficient of 30% extra or the like and the section point, for example, to be reflected in the points to be given to the driver who accepts traveling under such restriction. The support server 300 can store and manage the evaluation coefficient corresponding to the restriction designating the time in the restriction field provided in the point management information table illustrated in FIG. 9. Note that such evaluation coefficient may also be recorded in the point management information table by taking settlement of the reservation information identified by the reservation ID as a trigger.

Further, the support server 300 of the first modification may evaluate increase/decrease in the arrival time for a planned alighting date and time registered in the reservation information of the reservation ID, and be reflected in the points to be given to the driver. For example, the support server 300 estimates predicted standard arrival time for the traveling route after the reservation information is settled. Such estimation of the predicted standard arrival time can be acquired via a service site that is connected to the network N1 and provides navigation information, for example. Alternatively, in a case where the onboard apparatus 100 cooperates with a navigation apparatus or the like mounted on the vehicle 10, the predicted arrival time or the like for the destination in a route guide presented by the navigation function may be acquired.

The support server 300 of the first modification provides a standard time field in the point management information table illustrated in FIG. 9, for example, and stores the predicted standard arrival time. Recording to the point management information table is done by taking acquisition of the predicted standard arrival time by the onboard apparatus 100 or via the network N1 as a trigger. Then, the support server 300 according to the first modification may calculate increase/decrease with respect to the predicted arrival time based on a difference between the time information at the time of arriving at the alighting point and the predicted arrival time. It is assumed that the arrival time at the alighting point is about 10 minutes earlier than the predicted arrival time. The support server 300 converts the difference time and adds an increase of 100 points to the section point for reflecting the increase/decrease with respect to the predicted standard arrival time in the evaluation of the driver. In the first modification, it is also possible to increase the willingness to participate in ridesharing by giving an incentive corresponding to the condition to the driver who drives the vehicle.

<Second Modification>

Figure 22:
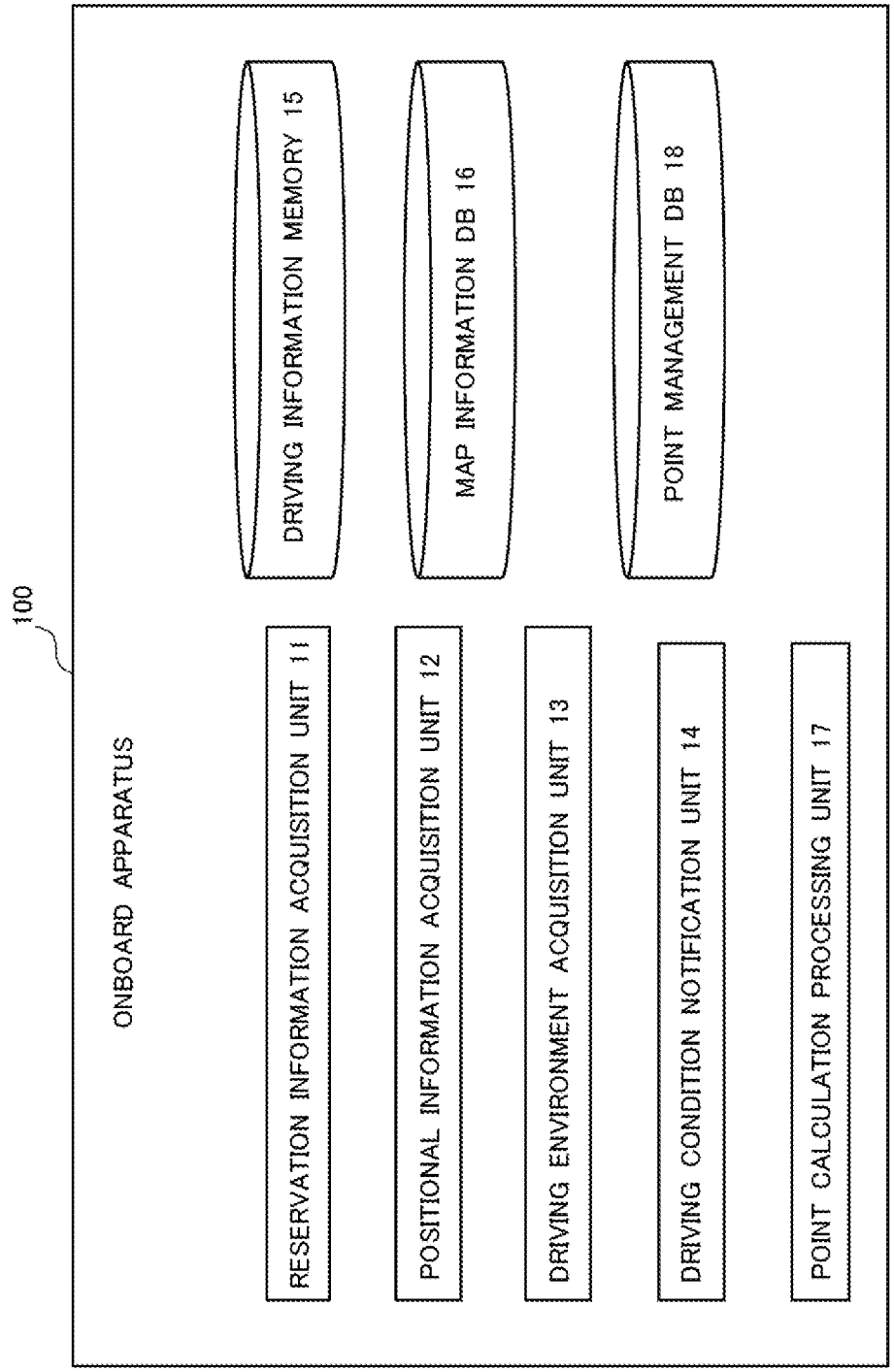
FIG. 22 is a diagram illustrating an example of a functional configuration of an onboard apparatus according to a second modification.

In a second modification, the onboard apparatus 100 can include the support processing functions of the support server 300 of the first embodiment. For example, as illustrated in FIG. 22, the onboard apparatus 100 of the second modification can include a point calculation processing unit 17 and a point management DB 18 in the functional configuration. The point calculation processing unit 17 corresponds to the support processing unit 33 of the support server 300 according to the first embodiment, and calculates the points given to the driver at the time of traveling on a route based on the history of the positional information and the history of the driving environment described in the flowcharts of FIG. 13 to FIG. 21. Further, the point management DB 18 corresponds to the ridesharing management DB 38 of the support server 300 according to the first embodiment, and stores the route traveling information table described in FIG. 8 and the point management information table described in FIG. 9.

The onboard apparatus 100 of the second modification identifies the driver ID of the driver driving the own vehicle based on the reservation information registered with the reservation ID, for example. Then, the onboard apparatus 100 extracts the history of the positional information and the history of the driving environment recorded in the driving information memory 15 at riding timing and alighting timing of the fellow passenger, for example, and stores the extracted histories to the route traveling information table of the point management DB 18. Further, the point calculation processing unit 17 of the onboard apparatus 100 refers to the route traveling information table of the point management DB 18, for example, and executes the processing of FIG. 13 to FIG. 21 at the alighting timing of the fellow passenger.

The point calculation processing unit 17 of the onboard apparatus 100 calculates the section points and the evaluation coefficients of the time zone for each riding section where the fellow passenger rode based on the positional information history acquired by the positional information detection unit 107, for example. Further, the point calculation processing unit 17 calculates the evaluation coefficients corresponding to the attributes of the road width for each riding section based on the positional information history acquired by the positional information detection unit 107 or the history of the video information captured by the camera 108A of the driving environment detection unit 108. Similarly, the point calculation processing unit 17 calculates the evaluation coefficients corresponding to the paving state for each riding section based on the history of the information indicating the road surface state acquired by the camera 108A, the road surface sensor 108D, and the acceleration sensor 108E. Further, the point calculation processing unit 17 calculates the evaluation coefficients corresponding to the precipitation condition of fog, rain, snow, or the like of each riding section based on the history of the information indicating the weather condition acquired by the rain sensor 108B and the wiper action detection sensor 108C. Also, the point calculation processing unit 17 calculates the evaluation coefficients corresponding to the stress state of the driver for each driving section based on the history of the biological information of the driver acquired by each component of the biological information detection unit 109. The calculated section points and the evaluation coefficients for evaluating the driving environment are recorded in the point management information table of the point management DB 18 as in the case of the first embodiment.

Further, in the onboard apparatus 100 of the second modification, the point calculation processing unit 17 may calculate the total point according to the information indicating the driving environment of the riding section based on the point management information table stored in the point management DB 18. The onboard apparatus 100 of the second modification can calculate the points to be given to the driver by taking the driving environment including at least one piece of information of the road attribute like the road width and the road surface condition described above, the weather condition, and the biological information of the driver as the evaluation condition. The onboard apparatus 100 according to the second modification also makes it possible to give the points according to the difficulty of driving in accordance with the driving environment, so that it is possible to perform proper evaluation of the contribution level of the driver for running on the route under such driving environment. With the second modification, it is also possible to increase the willingness to participate in ride-sharing by giving an incentive corresponding to the condition to the driver who drives the vehicle.

OTHER EMBODIMENTS

The above-described embodiments are simply examples, and the disclosure of the embodiments can be implemented by adding changes as appropriate within a spirit and a scope thereof. The processing and means described in the present disclosure can be implemented in combination in a flexible manner as long as there is no technical confliction.

Further, the processing described to be performed by a single device may be allotted and executed by a plurality of devices. Also, the processing described to be performed by different devices may be executed by a single device. In a computer system, it is possible to flexibly change the hardware configuration (server configuration) for implementing each function.

Programs causing an information processing apparatus or another machine or device (hereinafter, referred to as a computer or the like) to implement any of the above-described functions can be recorded in a recording medium that can be read by the computer or the like. Such functions can be provided by having the computer or the like read out and execute the programs in the recording medium.

Note here that the recording medium that can be read by the computer or the like is a recording medium that accumulates information such as data, programs, or the like by electrical, magnetic, optical, mechanical, or chemical action, and allows the computer or the like to read out. Examples of such recording medium that can be removed from the computer or the like may be a flexible disk, a magneto-optical disk, a CD-ROM, a CD-R/W, a DVD, a Blu-ray Disc, a DAT, 8-mm tape, and a memory card such as a flash memory. Further, examples of the recording medium fixed to the computer or the like may be a hard disk and a ROM.

What is claimed is:
1. An onboard apparatus comprising:
a controller configured to:
 acquire, during ride sharing of a vehicle, driving environment information regarding a driving environment along a route from a riding point of a passenger riding in the vehicle, which is a point where the passenger begins ride sharing, to an alighting point where the passenger alights from the vehicle;
 calculate a number of points to be allocated to a driver who drives the vehicle along the route according to the acquired information regarding the driving environment; and
 transfer the calculated number of points to the driver.
2. The onboard apparatus according to claim 1, wherein the controller acquires, as the driving environment information, at least one of an attribute of the route, a weather condition when driving on the route, and a stress state of the driver who drives the vehicle along the route.
3. The onboard apparatus according to claim 2, wherein the attribute of the route includes at least one of distance of the route, a road width of the route, and extent of paving of a road surface of the route.
4. The onboard apparatus according to claim 2, wherein the weather condition when driving on the route includes at least one of existence of precipitation when traveling on the route and a precipitation amount.

5. The onboard apparatus according to claim 2, wherein the stress state of the driver who drives the vehicle includes at least transition of biological information acquired from the driver.

6. An information processing apparatus comprising:
   a communication unit; and
   a controller configured to:
      acquire, via the communication unit and during ride sharing of a vehicle, driving environment information regarding a driving environment along a route from a riding point of a passenger riding in the vehicle, which is a point where the passenger begins ride sharing, to an alighting point where the passenger alights from the vehicle;
      calculate a number of points to be allocated to a driver who drives the vehicle along the route according to the driving environment information regarding the driving environment; and
      transfer the calculated number of points to the driver.

7. An information processing method executed by a computer including a communication unit, the method comprising steps of:
   acquiring, via the communication unit and during ride sharing of a vehicle, driving environment information regarding a driving environment along a route from a riding point of a passenger riding in the vehicle, which is a point where the passenger begins ride sharing, to an alighting point where the passenger alights from the vehicle;
   calculating a number of points to be allocated to a driver who drives the vehicle along the route according to the driving environment information regarding the driving environment; and
   transferring the calculated number of points to the driver.

8. A non-transitory computer readable storing medium recording a computer program for causing a computer including a communication unit to perform a method comprising steps of:
   acquiring, via the communication unit and during ride sharing of a vehicle, driving environment information regarding a driving environment along a route from a riding point of a passenger riding in the vehicle, which is a point where the passenger begins ride sharing, to an alighting point where the passenger alights from the vehicle;
   calculate a number of points to be allocated to a driver who drives the vehicle along the route according to the driving environment information regarding the driving environment; and
   transferring the calculated number of points to the driver.

* * * * *